United States Patent
Chow

(10) Patent No.: US 7,295,330 B2
(45) Date of Patent: Nov. 13, 2007

(54) FILM MAPPING SYSTEM

(76) Inventor: Peter P. Chow, 2317 Byrnes Rd., Minnetonka, MN (US) 55305

( * ) Notice: Subject to any disclaimer, the term of this patent is extended or adjusted under 35 U.S.C. 154(b) by 0 days.

(21) Appl. No.: 10/889,359

(22) Filed: Jul. 12, 2004

(65) Prior Publication Data

US 2005/0046850 A1   Mar. 3, 2005

Related U.S. Application Data

(60) Provisional application No. 60/486,492, filed on Jul. 11, 2003.

(51) Int. Cl.
*G01B 11/28* (2006.01)
(52) U.S. Cl. .................. 356/630; 356/445; 356/237.1
(58) Field of Classification Search ........ 356/300–334, 356/630–632
See application file for complete search history.

(56) References Cited

U.S. PATENT DOCUMENTS

| | | | |
|---|---|---|---|
| 3,798,450 A * | 3/1974 | Reynolds et al. | 356/613 |
| 4,264,205 A * | 4/1981 | Landa | 356/326 |
| 5,020,909 A * | 6/1991 | Landa | 356/300 |
| 5,068,749 A * | 11/1991 | Patel | 356/519 |
| 5,351,117 A * | 9/1994 | Stewart et al. | 356/30 |
| 5,475,221 A * | 12/1995 | Wang | 250/339.07 |
| 5,523,846 A * | 6/1996 | Haga | 356/445 |
| 5,719,024 A * | 2/1998 | Cabib et al. | 435/6 |
| 5,822,060 A * | 10/1998 | Linowski et al. | 356/318 |
| 6,075,591 A * | 6/2000 | Vokhmin | 356/239.1 |
| 6,167,171 A * | 12/2000 | Grasis et al. | 385/24 |
| 6,373,568 B1 * | 4/2002 | Miller et al. | 356/326 |
| 6,654,132 B1 * | 11/2003 | Schietinger et al. | 356/630 |
| 2002/0015148 A1 * | 2/2002 | Tomomatsu | 356/237.2 |
| 2003/0030801 A1 * | 2/2003 | Levenson et al. | 356/326 |
| 2004/0246493 A1 * | 12/2004 | Kim et al. | 356/504 |

* cited by examiner

*Primary Examiner*—Layla G. Lauchman
*Assistant Examiner*—Juan D Valentin, II
(74) *Attorney, Agent, or Firm*—Kinney & Lange, P.A.

(57) ABSTRACT

A materials properties measuring system for using electromagnetic radiation interactions with selected materials positioned at a measuring location to determine selected properties thereof having an electromagnetic radiation source along with a plurality of radiation convergence elements for receiving any incident beams of electromagnetic radiation including the source having corresponding selected cross sections substantially perpendicular to the input path, and for converging these incident beams into corresponding departing beams including to the selected material each having a selected cross section substantially perpendicular to the output path that is smaller than that of its corresponding incident beam, and transmitting them to a beamsplitter that has an area as great as any such element. An electromagnetic radiation receiver is provided to receive any beams of electromagnetic radiation incident thereon after propagating thereto from the beamsplitter.

The electromagnetic radiation source for providing propagating selected electromagnetic radiation at an output thereof is formed by a plurality of electromagnetic radiation emitters with differing center emission wavelengths and a beam combiner is provided with them wherein any electromagnetic radiation emitted by any of said electromagnetic radiation emitters enters at differing points to follow at least in part a common optical path to an output through at least some portion of the combiner determined by reflections and transmissions thereof in and at the combiner.

33 Claims, 14 Drawing Sheets

FILM MAPPING SYSTEM

CROSS-REFERENCE TO RELATED APPLICATION

This application claims the benefit of Provisional Application No. 60/486,492 filed Jul. 11, 2003 for "FILM MAPPING SYSTEM".

BACKGROUND OF THE INVENTION

The present invention relates to optical measurements of thickness and other physical properties of specimens of thin-films or other material forms typically provided on a substrate and, more particularly, to methods and apparatus to perform such measurements over entire specimens rapidly in obtaining the desired specimen characteristics in a single measurement step.

Many industrial manufacturing processes require measurements of thickness and other physical properties of specimens of thin-films supported on a substrate, typically formed of a solid material, or specimens of gaseous or liquid materials supported in an appropriate manner or some combination thereof. In general, for a film measurement based on light transmission therethrough, for instance, a light source, perhaps a broadband white light ("WL") source, provides light transmitted through an illumination optics system to impinge collimated or focused on, and then pass through, the film specimen under test. The light emerging from the other side of the specimen is collected by a collection optics system and directed to a detector which in turn develops corresponding photovoltage response signals to be amplified and used in subsequent signal processing steps. Similarly, for a film measurement based on reflection of light from the film surface or surfaces, such light provided by an illumination optics system is directed collimated or focused onto, and then reflected from, the surface or surfaces of the specimen under test, and the reflected light is thereafter collected by a collection optics system for a detector that provides the signals for subsequent signal processing. In this process, the transmitted light may be directed through a beamsplitter and reflected back to the same beamsplitter from the surface of the specimen to conveniently provide and collect the light on paths at least initially perpendicular to that surface.

More particularly, many semiconductor fabrication processes, for instance, involve deposition and removal of thin-films of various materials. As an example, chemical-mechanical polishing ("CMP") is a process widely used to planarize both metals, such as copper, and dielectrics, such as silicon dioxide. In this process, the thickness of the films being polished, especially the uniformity of thickness thereof over the surfaces of the entire specimens, is critical to the fabrication yield of the resulting products. In photonics manufacturing processes, such as those for the fabrication of semiconductor laser diodes ("LDs"), vertical-cavity surface emitting lasers ("VCSELs"), dense wavelength-division multiplexing ("DWDM") film filters, optical waveguides, etc., the measurement and control of film thicknesses again are critical to the quality of the products resulting from fabrication.

There are two categories of technology methods for measuring the distribution of film thickness and other physical characteristics over the entire specimen: the full-wafer imaging method and the scanning method. One imaging spectrometer for measuring film thickness over an entire semiconductor wafer uses a broadband light source, such as a halogen lamp, in combination with a rotating filter wheel assembly, to form a monochromator. The associated optical system enables illumination of the wafer by a collimated beam. This allows collection of spectroscopic reflectance data from the entire wafer relatively rapidly. Nevertheless, there are several disadvantages limiting the performance of this system. First, the filter wheel assembly requires mechanical movements over a large range. This usually is undesirable for precise measurements such as those in semiconductor and photonics industries, for instance. This kind of mechanical movement is usually slow, and so the speed of the system, therefore, is limited. In addition, such movements are noisy, may cause substantial vibrations, and are a possible source for generating small particles due to material wear or other sources. Also, the bandwidth of the filters in the rotating filter wheel assembly is in the range of 3 to 5 nm, which is too wide for precise measurements. Another issue is the beam collimating system. This system uses either a lens or an off-axis parabolic reflecting mirror to provide a collimated illumination beam. As the diameter of specimens desired to be tested continues increasing in practical fabrication processes, large aperture lenses and off-axis parabolic mirrors are required. Both can be very expensive and require considerable complexity to correct the optical aberrations occurring in them. These considerations become acute, for instance, in fabricating semiconductor logic and memory devices for which 300 mm wafers are currently commonly used. In display devices, such as liquid-crystal ("LC") display panels, the sizes encountered are even larger.

Several other designs have been disclosed related to this art including the use of a spherical vacuum chuck to deform a semiconductor wafer into serving as a concave mirror. In this way, the illumination light beam is reflected backward in the direction of the incident light beam. As a result, a relatively small lens may be used to illuminate a large wafer. In practical implementation, however, this arrangement can induce considerable difficulty. First, a wafer so deformed may not result in forming an optical-grade reflective mirror, especially for large diameter (aperture) wafers, and so the resulting defocusing and spherical aberrations may, as a practical matter, defeat this method for precise measurements. Moreover, in most semiconductor fabrication processes, bending the wafers in process is highly undesirable, and often, unacceptable. In another arrangement, a filter wheel assembly is placed in front of a charge-coupled device ("CCD") camera. A ground glass screen is placed in front of the broadband light source to diffuse the illumination light. This system allows more reflected light to be collected. However, because the angle of incidence ("AOI") of the diffused illumination light is, as a result, undefined (with certain random components), a portion of the reflected light related to the diffused illumination light, instead of contributing to the useful signal, contributes to unwanted noise. This result, for practical applications, is disadvantageous.

Another system measures thick wafers by using an imaging Fourier interferometer based on an infrared light source to form a Fourier transform infrared ("FTIR") spectrometer. The semiconductor wafer specimens also need to be deformed by a spherical vacuum chuck.

Typically, a complete wafer imaging system with a collimating objective is able to provide a spatial resolution at the semiconductor wafer surface plane of about 200 microns ($\mu$m) per pixel. To achieve higher resolution (e.g., 5 to 10 $\mu$m per pixel, for instance), a system can use a scanning microscope objective lense or a sparse array of lenses. This arrangement, in fact, can be regarded as a technology belonging to the second technology category indicated above, scanning systems for measuring the distribution of film thickness and other physical properties over the surface of the entire specimen.

In the category of scanning systems, conventional film measurement technologies, such as reflectometry and ellipsometry, are used to perform single-point measurements. The distribution of the characteristics of interest of the film specimens is obtained either by placing the semiconductor wafer on a scanning stage to be moved past the optical head, or by moving the optical head to scan the entire fixed position semiconductor wafer, such as an ellipsometer with a beam deflector, which translates the optical head, allowing point-to-point and site-to-site measurements.

Another type of scanning system is a microscope objective-based spectroreflectometer. Commercially available instruments have been developed, based on the same scanning measurement principle.

A further slightly different system is based on a line-scan spectroreflectometric principle. Instead of the above point-to-point scanning-measuring scheme, this prior art uses a cylinder lense to form a line of illumination across the entire wafer. The wafer is then translated in the direction perpendicular to this illumination line. In this line-scan method, the spectral reflectance data over the entire wafer are obtained. Detection is provided by a two-dimensional CCD array that is used to collect the spectral reflectance data. One dimension of the CCD, in combination with a diffraction grating, is used to measure dispersed light. Light at different wavelengths corresponding to different angles is collected by different pixels of the CCD array in this dimension. This arrangement, actually, is the fundamental constraint to prevent this system from complete wafer imaging, because only one dimension of the CCD can be used to distinguish spatial positions on the wafer surface plane. This, in turn, makes the line-scan necessary.

In these inventions, a key device is a spectrometer which measures the distribution of light power reflected from or transmitted through the film specimen under test over a given spectral range. The spectrometer, constructed with light-emitting diodes ("LEDs"), has been developed in a variety of configurations. Two LEDs at different wavelengths are used to illuminate a film sample under test. The light reflected from the sample is collected and provided to a photodetector, and the corresponding reflectance spectrum data are analyzed. In this system, the LEDs are considered to be monochromatic light sources and no further wavelength dispersion means are used. LEDs, with a fill-width at half-maximum value ("FWHM") spectral width in the range of $\Delta\lambda_{FWHM}=20$ to 100 nm, may be considered narrowband or monochromatic for certain applications. Most precise measurement applications, such as those in semiconductor and photonics metrology, require much higher wavelength resolution, i.e. narrower spectral width spreads. A straight-forward method to overcome this issue is to combine LEDs with a monochromator. In this way, the LED assembly is nothing more than a broadband light source which replaces conventional sources such as halogen lamps, for instance. Typically, a monochromator consists of a dispersive element, such as a diffraction grating, and a scanning output slit to select a specific wavelength. Thus, the dispersive element can be a holographic, concave, reflective grating with Au or Al coatings, the light source can be a set of 80 LEDs in a two-dimensional array of 4 rows and 20 columns, and the output slit is driven by a stepper motor, to scan over a spectrum range from blue (470 nm) to mid-infrared (40,000 nm).

Wavelength scanning also may by realized by an oscillating grating. Light from an LED array, in the spectrum range of 1100 to 2600 nm, with $\Delta\lambda=100$ nm, is coupled to the entrance slit of a monochromator via optical fibers. Both the entrance and exit slits are fixed. The wavelength selection is realized by a motor-driven concave reflective diffraction grating.

In this class of prior art, the LEDs only serve as a robust, long lifetime, and cheap broadband light sources. The fundamental operation principle is the same as that in the conventional spectrometer with a scanning monochromator. The mechanical movements, which are necessary for the operation of that type of spectrometer, however, are highly undesirable in many applications, for instance in semiconductor and photonics metrology. Mechanical movement usually are slow, noisy, bulky and expensive. In addition, they may be potentially sources from which particles are generated, which are extremely detrimental to wafer chip yield in semiconductor manufacturing processes.

One alternative to the LED-monochromator type spectrometer provides wavelength selection through an arrangement of spatial positions of each of the LEDs in the LED array. Both the concave reflective grating used and the exit slit are fixed. There is no entrance slit, and the active area of each LED is used as the equivalent of an entrance slit. As each LED is turned on, the angular positions of the LED and the exit slit in reference to the normal of the diffraction grating reflective surface changes. This, in turn, is equivalent to a virtually "scanning" entrance slit. As a result, the fixed exit slit will allow different wavelengths to be selected. Because of the finite size of the LED active area, the wavelength resolution of this spectrometer is not high, i.e., $\Delta\lambda_{FWHM}$ is in the range of 11.5 to 13.5 nm. This is suitable for applications in chemical technology and biotechnology, such as for foodstuff inspection, for instance. For precise measurements, such as those in semiconductor and photonics metrology, this wavelength resolution is not sufficient.

There are other applications utilizing tunable filters, e.g., acousto-optic tunable filters ("AOTFs"), for wavelength selection. They usually operate in the near infrared ("NIR") to result, for example, in a NIR spectrometer in the wavelength range above 900 nm to 3900 mn. Uses are usually in chemical technology and biotechnology related industries, such as food and dairy, pharmaceutical and agriculture, for instance. An example is a spectrometer on a chip, made of lithium niobate (or $LiNbO_3$) formed on a silicon substrate, integrating an LED array and an AOTF, for use in analyzing gas and fluid samples.

Usually, LED-based spectrometers are used for chemical technology and biotechnology related applications, such as concentration analysis, for instance. In those applications, the requirements for the wavelength resolution and wavelength stability can be relaxed. In precise measurements, such as those in semiconductor and photonics metrology, requirements for those parameters are much more strict. In semiconductor film thickness measurements, for instance, most commercially available tools are capable of measuring multilayer film stacks thicknesses with sub-Angstrom 3-σ precision for thin-films, and better than 1% precision for thick films. Existing LED spectrometers, with spectral widths in the range of a couple of nanometers to more than ten nanometers, are unable to meet the wavelength resolution requirements for precise measurement applications.

Furthermore, both the wavelength and the intensity of light emitted by LEDs depend strongly on temperature variations due to the dependence of the emission energy spectrum thereof on the LED temperature. Theoretically, this emission energy spectrum is defined by the Boltzmann distribution which is proportional to exp(−kT), where k is the Boltzmann constant and T is the temperature, on the high photon energy side of the spectrum, and the density of states, which is proportional to $(E-E_g)^{1/2}$, where E is the energy and $E_g$ is the bandgap energy, on the low photon energy side. As a result, increasing temperature will shift the emitted light wavelengths to the longer side (red-shift), and concurrently decreases the intensity. Without proper calibration and stabilization means, LED spectrometers are unable to meet the requirements for precise measurements mentioned above.

BRIEF SUMMARY OF THE INVENTION

The present invention provides a materials properties measuring system for using electromagnetic radiation interactions with selected materials positioned at a measuring location to determine selected properties thereof having an electromagnetic radiation source for providing propagating selected electromagnetic radiation at an output thereof along with a plurality of radiation convergence elements each for receiving any incident beams of electromagnetic radiation incident thereon after propagating along an input path thereto, where provided in at least some part from the selected electromagnetic radiation, with said incident beams having corresponding selected cross sections substantially perpendicular to the input path, and for converging these incident beams into corresponding departing beams each propagating along an output path therefrom with the departing beams each having a selected cross section substantially perpendicular to the output path that is smaller than that of its corresponding incident beam in at least one cross section direction after propagation along the output path, there being one of the plurality of radiation convergence elements having the selected electromagnetic radiation propagating along the input path thereto and there being another of the plurality of radiation convergence elements having the output path therefrom intersecting a selected material if positioned at the measuring location.

There is also a beamsplitter for receiving at an incident surface thereof incident beams of electromagnetic radiation incident thereon after propagating along an input path thereto and for splitting these incident beams into corresponding pluralities of departing beams each propagating along a corresponding one of a plurality of output paths therefrom differing from one another, the beamsplitter incident surface having an area substantially equaling or exceeding that said incident beam cross section of maximum area in incident beams that any of said plurality of radiation convergence elements receive for converging thereby, the beamsplitter being positioned to have the beamsplitter incident surface intersect an input path to or an output path from at least one of the plurality of radiation convergence elements. An electromagnetic radiation receiver is provided to receive any beams of electromagnetic radiation incident thereon after propagating thereto from the beamsplitter.

The electromagnetic radiation source for providing propagating selected electromagnetic radiation at an output thereof is formed by a plurality of electromagnetic radiation emitters, either light-emitting diodes or laser diodes, with differing center emission wavelengths. A beam combiner is provided with them wherein any electromagnetic radiation emitted by any of said electromagnetic radiation emitters follows at least in part a common optical path to an output through at least some portion of the combiner determined by reflections and transmissions thereof in and at the combiner with any electromagnetic radiation emitted from the electromagnetic radiation emitters entering the optical path at an entry point corresponding to that electromagnetic radiation emitter emitting same with each entry point differing in location along the optical path from those locations of those remaining other entry points.

DETAILED DESCRIPTION

Figure 1:
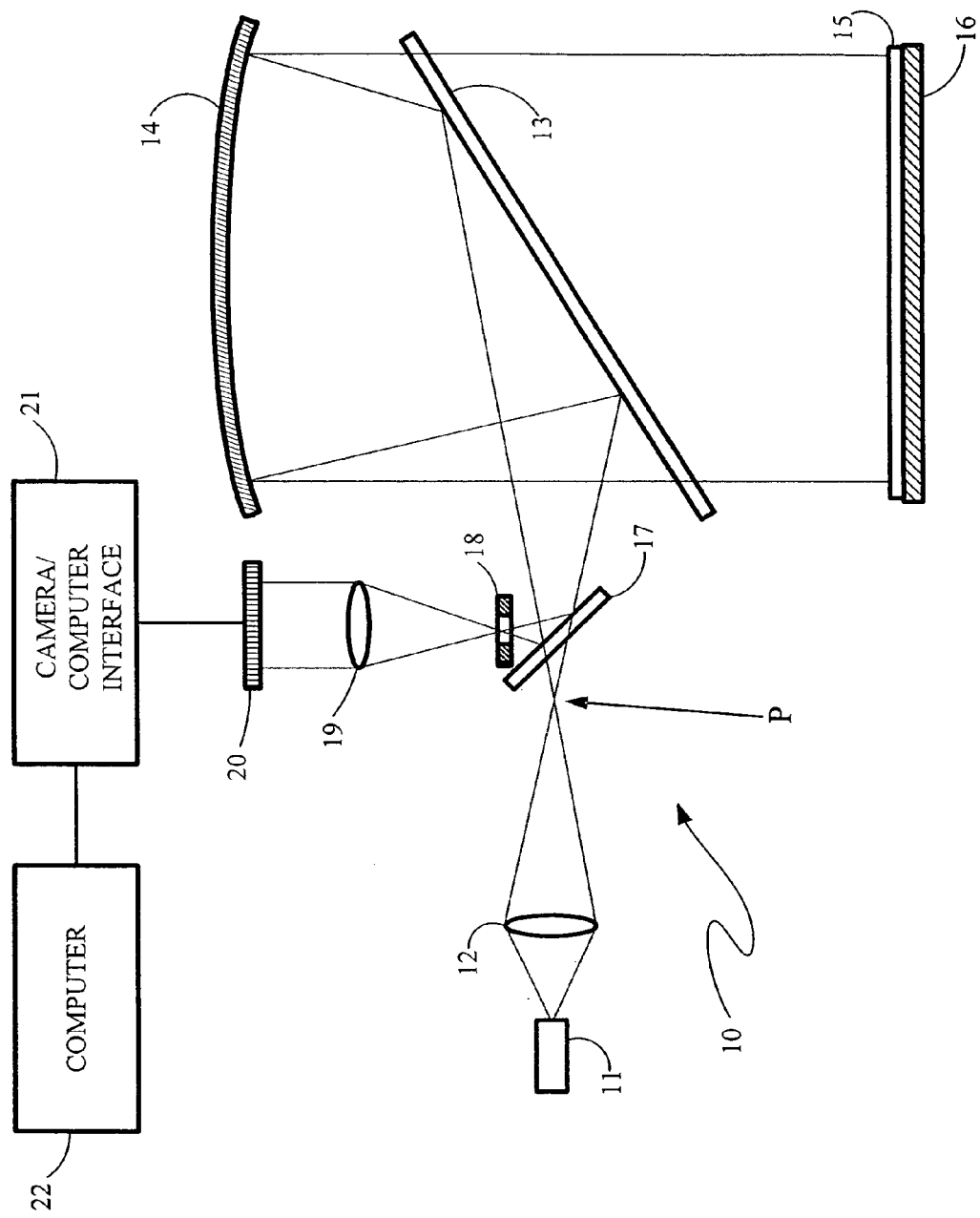
FIG. 1 shows an embodiment of a rapidly operating, large aperture, complete specimen measurement system of the present invention based on specimen light reflection.

FIG. 1 shows a rapidly operating, complete thin-film specimen measurement system, 10, having a broadband light source, 11, simulating a white light source, and that is formed by an array of narrowband light sources, such as laser diodes or light-emitting diodes. A more detailed description of array 11 of narrowband light sources will be given below. Thin-films of solid materials are used as examples herein but such measurements can also be made of gaseous or liquid materials appropriately provided for such measuring, or combinations thereof.

An illumination lens, 12, near the light source 11, a large aperture beamsplitter, 13, and an on-axis parabolic (or, alternatively, spherical) mirror, 14, together form a large aperture, complete specimen illumination system for directing light emitted by source 11 to illuminate a film specimen, 15, supported on a substrate, 16. A small aperture beamsplitter, 17, is positioned in the illumination light path with the unwanted, but unavoidable, effect of splitting away a portion of the illumination light beam, this position being necessary for the use of this beamsplitter in the light collection system described below for retrieving light reflected from surfaces of specimen 15.

An image of light source 11 is formed by lens 12 at focal point P which is also the first focus point of on-axis parabolic mirror 14 as determined in conjunction with the reflecting surface of large aperture beamsplitter 13 and the transmission characteristic of small aperture beamsplitter 17. In this arrangement, the remaining light from source 11, after focusing at point P to then diverge and partially pass through small aperture beamsplitter 17 (the portion reflected from beamsplitter 17 is lost), next partially passes through, and is partially reflected from, large aperture beamsplitter 13 (the portion passing through beamsplitter 13 is lost). The still divergent portion of the light beam reflected from large-aperture beamsplitter 13 then propagates to impinge on-axis parabolic mirror 14, this impinging beam diverging from mirror 14 focal point P thereby being collimated in being reflected by on-axis parabolic mirror 14. This collimated beam arrives at large aperture beamsplitter 13 again to once more partially pass through, and partially reflect from, that beamsplitter so that the portion of the light beam that is transmitted therethrough can further propagate to, and impinge on, the entire surface of interest of thin-film specimen 15 under test as determined by the effective aperture exposing that specimen to such light (the portion of the collimated beam reflected from beamsplitter 13 being lost).

The ratio of reflectance and transmittance of the beamsplitters is usually 50:50, so each time that a light beam both passes through, and is reflected from, a beamsplitter there will be around 50% of the light power directed into each of the associated transmission and reflection paths. Since the light in only one of these paths emanating from a beamsplitter is typically used in the signal processing associated with an optical system containing it, around 50% of the light power incident on such a beamsplitter will be lost to the signal processing portion of the system. Thus, in an optical system light power budget, the light power from the optical source therein must be great enough to ensure that the optical signal provided at the optical system output has a sufficient optical signal to noise ratio. In fact, given the power level typically provided by conventional commercially available LED and LD light sources, achieving the necessary source light power level is readily accomplished.

In the reflection measurement configuration shown in FIG. 1, the collimated light beam impinging on specimen 15 is reflected by that specimen. The reflected light power distribution over the entire aperture exposing specimen 15 is related to the physical characteristics of the specimen. Particularly, when specimen 15 is illuminated by several light beams of various wavelengths in sequence, spectral reflectance data can be sequentially collected for each of those wavelengths. In the collection path, such reflected light propagates back to large aperture beamsplitter 13 so that light is partially transmitted therethrough, and partially reflected therefrom(and lost). This transmitted portion of the light is then reflected by on-axis parabolic mirror 14 onto a convergent path to beamsplitter 13 to again be partially transmitted therethrough (and lost), and partially reflected therefrom. The portion of that light reflected by on-axis parabolic mirror 14 and by beamsplitter 13 reaches beamsplitter 17 where again this convergent beam is partially transmitted therethrough (and lost), and partially reflected therefrom toward a second focal point set by mirror 14, the reflection characteristic of the reflecting surface of beamsplitter 13, and the reflection characteristic of the reflecting surface of small beamsplitter 17 with this second focal point being located at the position of a spatial filter ("SF"), 18. After passing this focal point, the convergent (focused) light beam becomes divergent and further arrives at a collection lens, 19, which forms the arriving divergent beam into a collimated beam that then propagates towards a charge-coupled device array detector, 20, i.e. a CCD array detector.

In the collection path, collection lens 19 and on-axis parabolic mirror 14, in conjunction with the reflecting surfaces of beamsplitters 13 and 17, are arranged to effectively form together a telescopic system. On-axis parabolic mirror 14 and lens 19 are confocal in having the focus of the former with the aid of the reflecting surfaces of beamsplitters 13 and 17 coincide with the focal point of the latter which are shown to occur in FIG. 1 at the location of spatial filter 18. CCD array 20 and specimen 15 in the aperture thereof thus are in conjugate, i.e. one is the image of the other. The photovoltage signals from CCD array 20 are then amplified and converted into digital signals in a camera/computer interface arrangement, 21, for further signal processing. The remaining electronic data acquisition system portions, and the signal processing systems, are provided in a computer, 22.

Spatial filter 18 is positioned at the common foci of mirror 14 and lens 19 to remove optical noise. In the optical system of FIG. 1, undesired interactions in the system of the unwanted light present therein that is lost to the signal processing system by being reflected from, or transmitted through, the system beamsplitters is of concern. Thus, spatial filter 18 is provided to effectively reject any stray light not reflected from the surface of specimen 15, thereby preventing such stray light from arriving at CCD array 20. Another advantage of the use of spatial filter 18 is that the optical system of FIG. 1 can be termed a "telecentric system." That is, this system is arranged so that movements of specimen 15 toward or away from parabolic mirror 14 along the normal to the surface of this mirror at the vertex thereof will not result in any movement of the image of that specimen on the surface of CCD array 20. As a result, the optical system of FIG. 1 is insensitive to the distance between the specimen and parabolic mirror 14 (the objective), thereby enabling accurate measurements of specimen 15 without the requirement of a complex and expensive auto-focus system.

The collection optical system thus basically meets the optical requirements for being a telescopic system. Specimen 15 under test is illuminated by a collimated light beam impinging thereon provided by the illumination system. After reflection of this incident beam from specimen 15, the reflected light beam is guided to CCD array 20, reaching that array also as a collimated light beam. In this manner, the mapping of a specific position on the surface of specimen 15 to a corresponding pixel or group of pixels in CCD array is straightforward and simple. The photovoltage signal developed at each pixel is directly proportional to the power of the light reflected from its corresponding specific position on the surface of specimen 15.

In some applications, such as those in semiconductor metrology, for instance, there may be a need to measure characteristics of a group of specifically defined areas on specimen 15, for example the so called "test pads" portions of a semiconductor wafer emerging from the fabrication process therefor. Typically, the length dimensions of these test pads substantially parallel to the wafer major surface are on the order of millimeters. On the other hand, the resolution of the optical system in the embodiments of the present invention is determined primarily by two factors, the numeric aperture ("NA") of the parabolic mirrors used, such as mirror 14, and the number of pixels in the CCD arrays used, such as array 20. One of the advantages of this invention is the use of on-axis parabolic mirrors which allows use of high NA mirrors of good optical quality. In fact, the optical system itself is not a serious limit to the achievable resolution. Even for a moderate NA=0.1 (mirrors of higher NA can be used), for a diffraction limited system, the minimum resolvable dimension on the specimen surface is determined by $d=1.22\lambda/NA$. For a wavelength $\lambda=1$ µm, $d=12.2$ microns, which is much smaller than is required. Hence, the only significant limit on the system resolution is the number of CCD array pixels. In testing thin-films over major surfaces of 200 mm diameter semiconductor wafers, moderate density two-dimensional CCD arrays with approximately 500×500 pixels are sufficient to reach a spatial resolution of about 400×400 µm. For 300 mm diameter wafers, a CCD array with 800×800 or 1000×1000 pixels will be needed to achieve about this same spatial resolution.

Typically, in testing thin-films on major surfaces of semiconductor wafers, the entire specimen wafer exposed surface may be viewed as being divided into a number of "die areas" to thereby provide a so called "die map". This may be accomplished by applying conventional image processing techniques in computer 22 to define the desired die areas in the specimen wafer exposed surface. Each such die area in the specimen wafer exposed surface will be mapped through the optical collection system to a corresponding mapped die area in the light incidence surface of CCD array 20 so as to include many pixels from that array within this corresponding mapped array die area. A sampling of test sites (typically either five sites or nine sites) for each corresponding mapped die area are appropriately selected. Again, each test site will map through the collection optical system to the light incidence surface of CCD array 20 so as to include several pixels of that array within the mapped test site, and photovoltage signals from each pixel in each such corresponding mapped test site are appropriately added together to generate an averaged signal corresponding to that specific specimen test site. Using the regression algorithms described below, the desired thin-film parameters for the corresponding die area test site can then be determined, typically the thickness or thicknesses of the film stack at that test site.

This test site representation signal so generated is described in greater detail by assuming a specimen semiconductor wafer exposed surface to be divided into $N_D$ die areas with each such die area being considered to be further divided into $N_S$ test sites. Thus, all of the corresponding pixels of interest in array 20 within the corresponding mapped test sites can be grouped into $N_D \times N_S$ test site groups where each test site on the specimen wafer exposed surface has an area defined by a length L and a width W. Consider CCD array 20 as having $M_{CCD} \times N_{CCD}$ total pixels with each pixel surface portion in the array light incidence surface being a corresponding square area having sides of length of w. These pixels are positioned adjacent to one another in the array light incidence surface so as to have a center of square-to-center of square distance between two adjacent pixels equal to p. If the magnification of the optical system is $M_{ag}$, the k-th test site centered at $(X_k, Y_k)$ in the specimen wafer exposed surface can be mapped onto the CCD array surface to thereby determine which of the pixels in the array are within the corresponding mapped test site area resulting from the mapping, or projecting, of this test site onto CCD array 20, or $$M_{ka} \leq m \leq M_{kb}$$

$$N_{ka} \leq n \leq N_{kb}$$

where $$M_{ag}(M_{ka}p-w) \geq X_k - L/2, M_{ag}(M_{kb}p+w) \leq X_k + L/2,$$

$$M_{ag}(N_{ka}p-w) \geq Y_k - W/2, M_{ag}(N_{kb}p+w) \leq Y_k + W/2.$$

In the above expressions, $M_{ka}$ and $M_{kb}$ represent the number of pixels in the CCD array light incidence surface in the pixel interval corresponding to X-direction of the mapped test site on the wafer with the zero value of each at the point on the array surface to which the point $(X_k, Y_k)$ in the specimen wafer exposed surface is mapped, while $N_{ka}$ and $N_{kb}$ represent the number of pixels in the CCD array light incidence surface in the pixel interval corresponding to the Y-direction of the mapped test site on the wafer with the zero value of each at the point on the array surface to which the point $(X_k, Y_k)$ in the specimen wafer exposed surface is mapped, respectively. The above expressions mean that the site centered at $(X_k, Y_k)$ on the wafer will be mapped to pixels m=$M_{ka}$, $M_{ka}+1$, ... $M_{kb}$ and n=$N_{ka}$, $N_{kb}+1$, ... $N_{kb}$, where m and n are counting indices to identify pixels of the CCD array in the pixel intervals corresponding to the mapped test site. As a result, the light signal power on CCD array 20, $P_{site}(k)$, corresponding to the $k^{th}$ test site on specimen 15 can be expressed as $$P_{Site}(k) = \frac{1}{(M_{kb} - M_{ka} + 1)(N_{kb} - N_{ka} + 1)} \sum_{m=M_{ka}}^{M_{kb}} \sum_{n=N_{ka}}^{N_{kb}} P_{Pixel}(m, n),$$

with $$k = 1, 2, \ldots N_D \times N_S,$$

where $P_{pixel}(m,n)$ is the light signal power on the pixel designated m,n. Of course, to measure the desired parameters pixel by pixel, the above-mentioned algorithms are applied to the signals corresponding to each pixel of CCD array 20.

In a typical thin-film parameter measurement process, the light reflected from specimen 15 is collected in the optical collection system to impinge on CCD array 20 and the photon flux, or light power, signal at each pixel is converted into a corresponding photovoltage signal. These photovoltage signals are then sent to computer 22 via camera/computer interface 21 for data processing including related calculations. Camera/computer interface 21, for instance, can be an RS 422 LVDS data transfer system in combination with a "frame grabber" that receives and digitizes these signals treated as a "display" of the specimen, and further stores, and is used in transfers of, the resulting digital information. Another commonly used camera/computer interface is a camera link which transfers parallel signals into series signals, and a "frame grabber" is also required to be used therewith. Yet another example of camera/computer interface 21 is to use IEEE 1394 Fire Wire System which transfers data to computer 22 via a PCMCIA card. Other commercially available hardware and software are provided by many CCD vendors.

Advantages of this system of FIG. 1 include, first, the use of collimated beam illumination to allow the system to take "snapshots" of the specimen reflection properties of the complete specimen through the correspondence of a portion thereof to each pixel in CCD array 20. In this way, the use of a suitably large numbers of CCD array pixels directly enables achieving a correspondingly fine spatial resolution over the surfaces of specimen 15. Next, the use of collimated beam illumination allows the distance between on-axis parabolic mirror 14 and specimen 15 to be freely adjustable without any detrimental effect to the system measurement performance. This flexibility in separation distance is especially advantageous when the system is intended to be used for in-situ monitoring of thin-films on substrates where the geometrical separation between them and system 10 is not fully in the tester's control, or where system 10 is to be integrated into other fabrication process equipment where again geometrical position relative to the thin-films to be tested may not be fully in the tester's control. Furthermore, in comparison with off-axis parabolic mirrors, on-axis parabolic mirrors are much easier to place in optical alignment along the light beam paths. This, in turn, translates into significant labor cost savings for manufacturing this system. Further, in comparison with off-axis parabolic mirrors, on-axis parabolic mirrors are much cheaper, particularly for mirrors with large apertures such as those used in this system in which the aperture can exceed 300 mm.

Another advantage follows because of having all of the optical components used therein being positioned in on-axis arrangement along the light path during operation, that being that the only aberration of concern is spherical aberration which is the easiest to compensate in comparison with other off-axis aberrations. As described above, even the NA of the optical system does not limit the spatial resolution. In addition, because both the illumination and detection are performed with collimated beams, and because of the on-axis configuration, there is no difference in the imaging quality for the pixels in the center of CCD array 20 as compared to those around the edge of that CCD array. As a result, the quality of the optical system has relatively little effect on the quality of the mapping from specimen 15 under test to CCD array 20.

Figure 2:
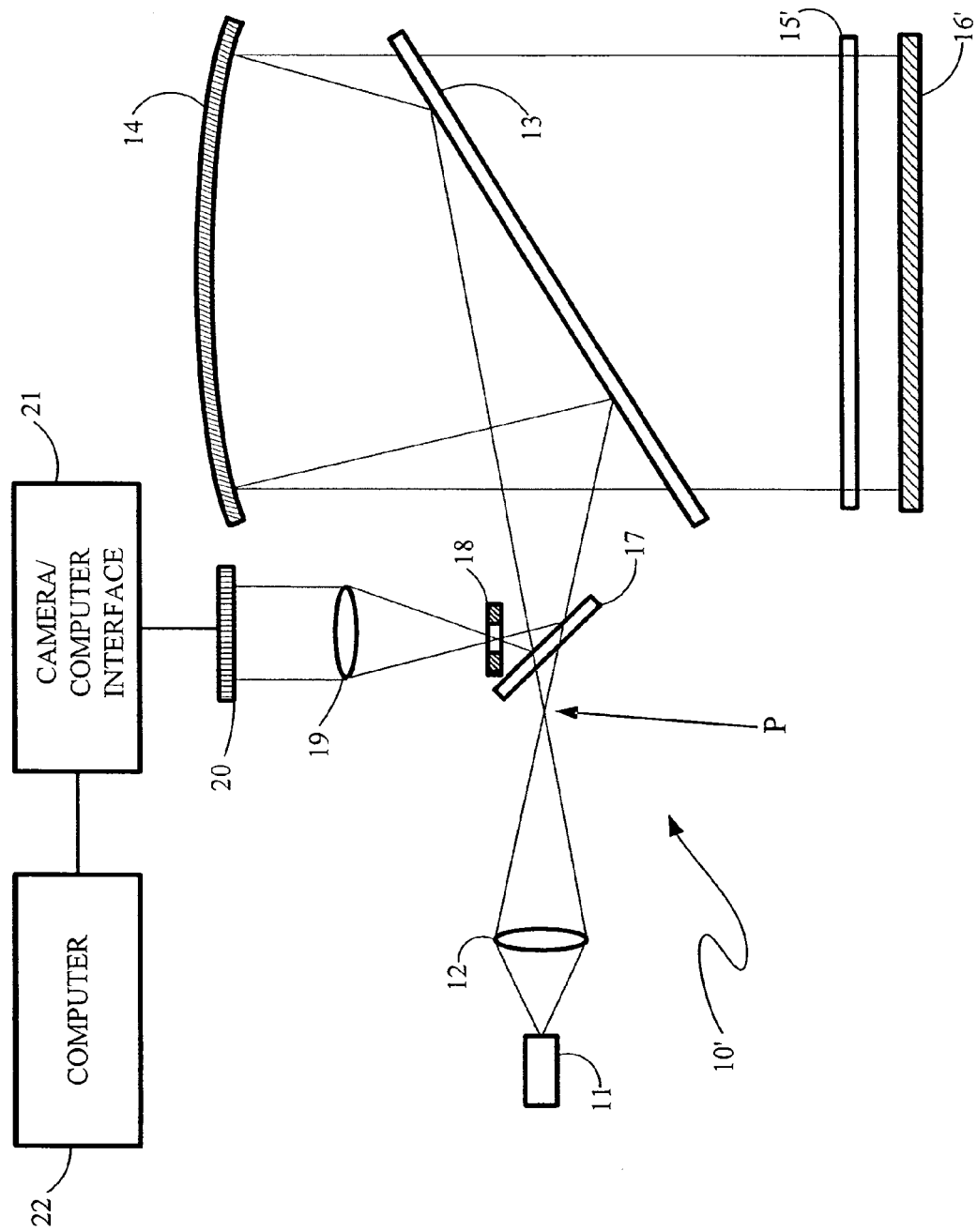
FIG. 2 shows an embodiment of a rapidly operating, large aperture, complete specimen measurement system of the present invention based on specimen light transmission.

FIG. 2 shows a another embodiment of specimen measurement system 10 designated 10' to be used for measuring parameters of a specimen, 15', that is transparent to the illuminating light. The illumination optical system in measurement system 10' is the same as that described for the measurement system of FIG. 1 so that the illuminating light follows the same illumination light path. Instead of directly collecting light reflected from the surfaces of specimen 15 of FIG. 1, a planar mirror, 16', is placed behind specimen 15' in FIG. 2. In this way, the illuminating beam, at least in part, first passes through specimen 15' to be reflected by mirror 16', and then at least in part passes through specimen 15' another time. The collection optical system in measurement system 10 is the same as that described for the measurement system of FIG. 1 so that this beam passing through specimen 15', after being reflected from mirror 16', propagates along the same light collection path as that described for the measurement system of FIG. 1.

Figure 3:
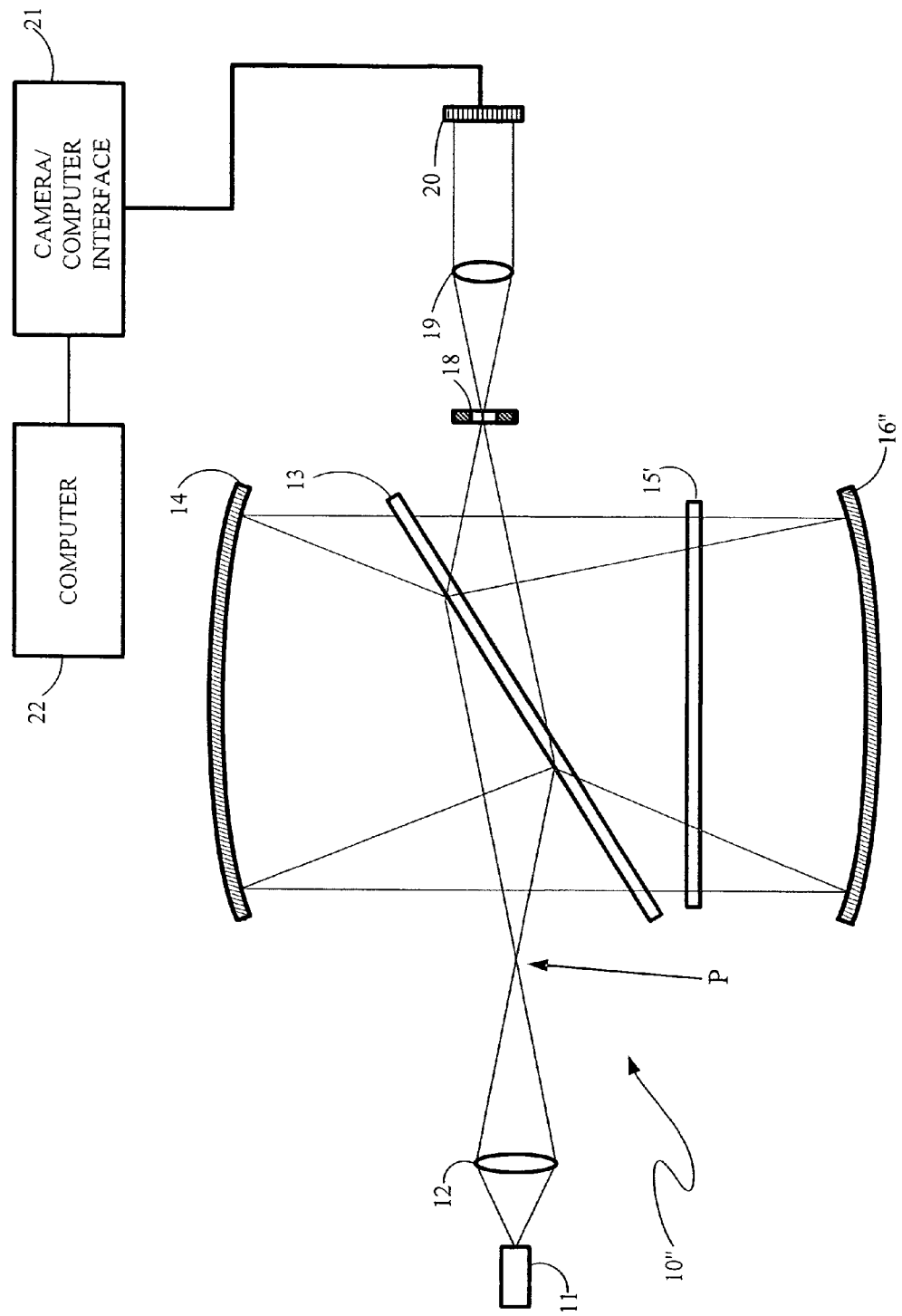
FIG. 3 shows an embodiment of a rapidly operating, large aperture, complete specimen measurement system of the present invention based on specimen light transmission.

FIG. 3 describes a further embodiment of this specimen measurement system, 10", using another configuration therefor in measuring the parameters of transparent specimen 15'. In this system, on-axis parabolic mirror 14 and another identical on-axis parabolic mirror, 16", are positioned to face each other along a common axis passing through the corresponding focus of each associated parabola. As a result, specimen 15' can be placed anywhere between these two mirrors without adversely affecting the measurement of its parameters. In specimen measurement system 10" shown in FIG. 3, the illumination optical system is again much the same as that described for the measurement system of FIG. 1 so that the illuminating light follows much the same illumination light path. The collimated illuminating light arrives from mirror 14 at specimen 15', passes through it, and is then reflected back toward that specimen by mirror 16". Because parabolic mirror 14 will focus the collimated beam into a convergent beam when the light reflected by this parabolic mirror arrives at specimen 15' again, the beam diameter at that point will thus be smaller than the specimen. This must be taken into account in subsequent data processing to allow for double-pass light being collected from the central region of specimen 15' while collecting only single-pass light from the peripheral region of that specimen. The principle of the collection of spectral transmittance is almost the same as that in FIG. 1, with the difference being that the collection path now is placed on the other side of the system, and thus it is not necessary to have small beamsplitter 17 of FIGS. 1 and 2 and its accompanying optical power loss.

Figure 4A:
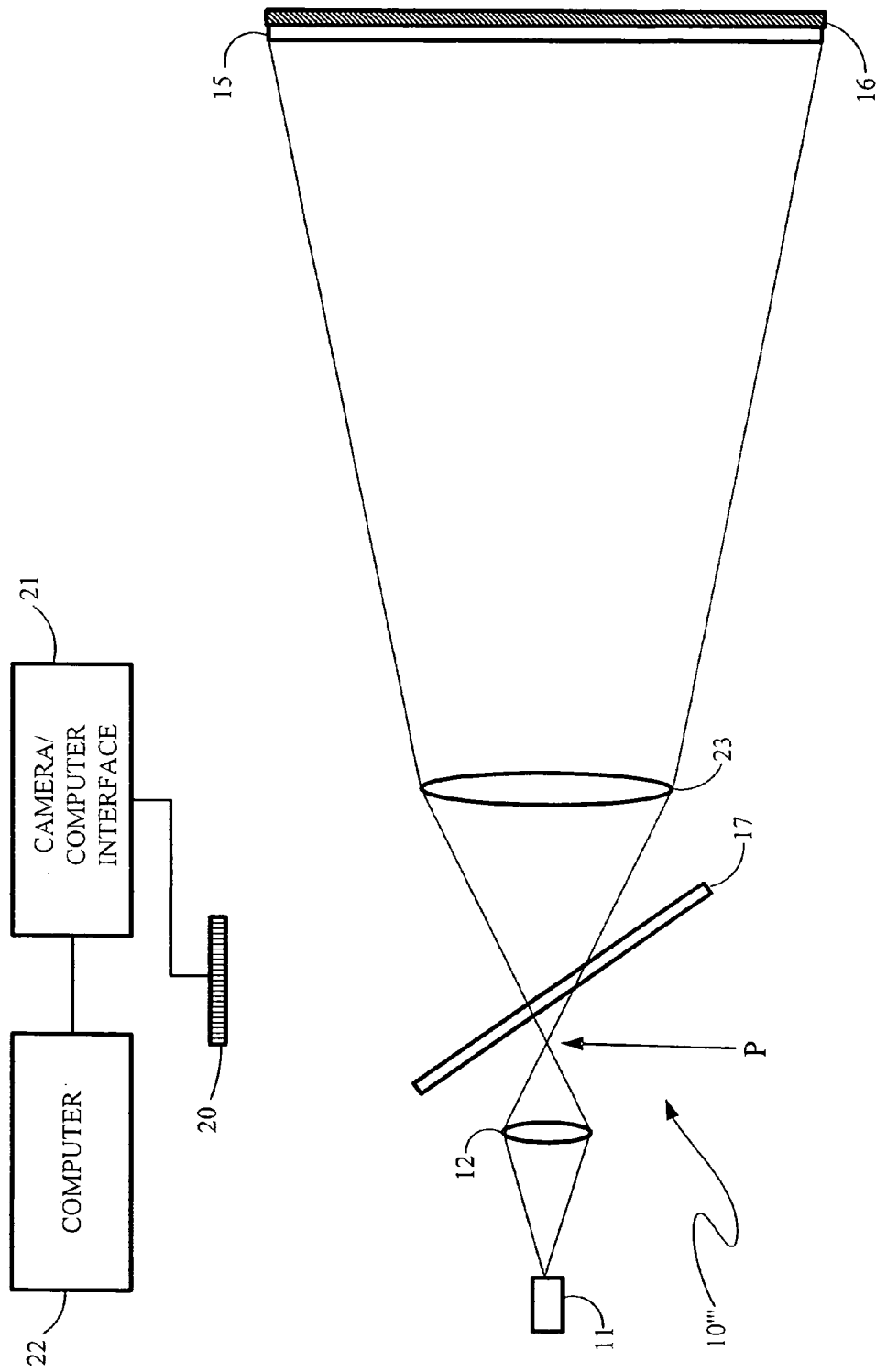
FIGS. 4A, 4B and 4C show an embodiment of a rapidly operating, large aperture, complete specimen measurement system of the present invention using a divergent beam configuration based on specimen light reflection.
Figure 4B:
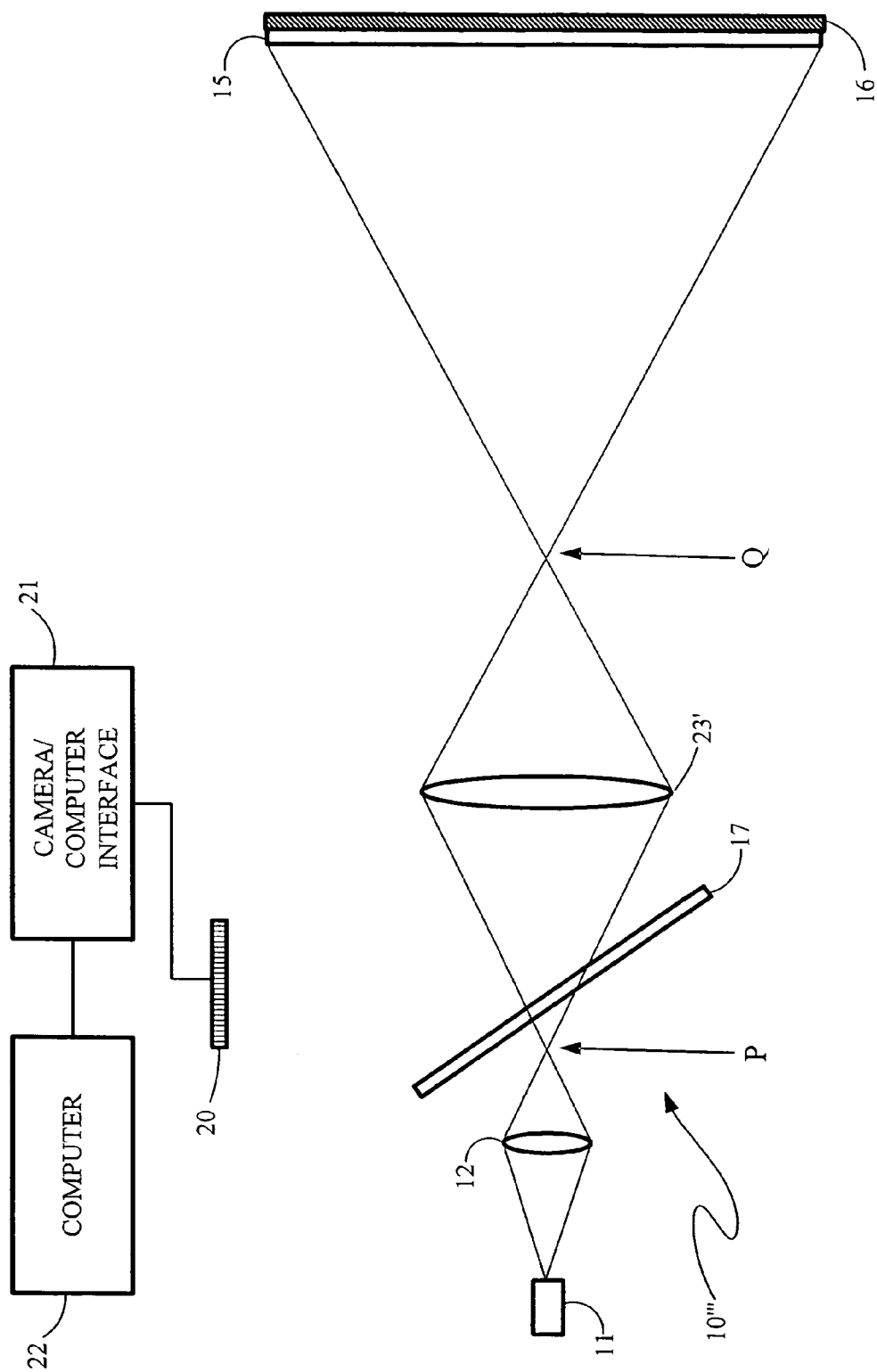
Figure 4C:
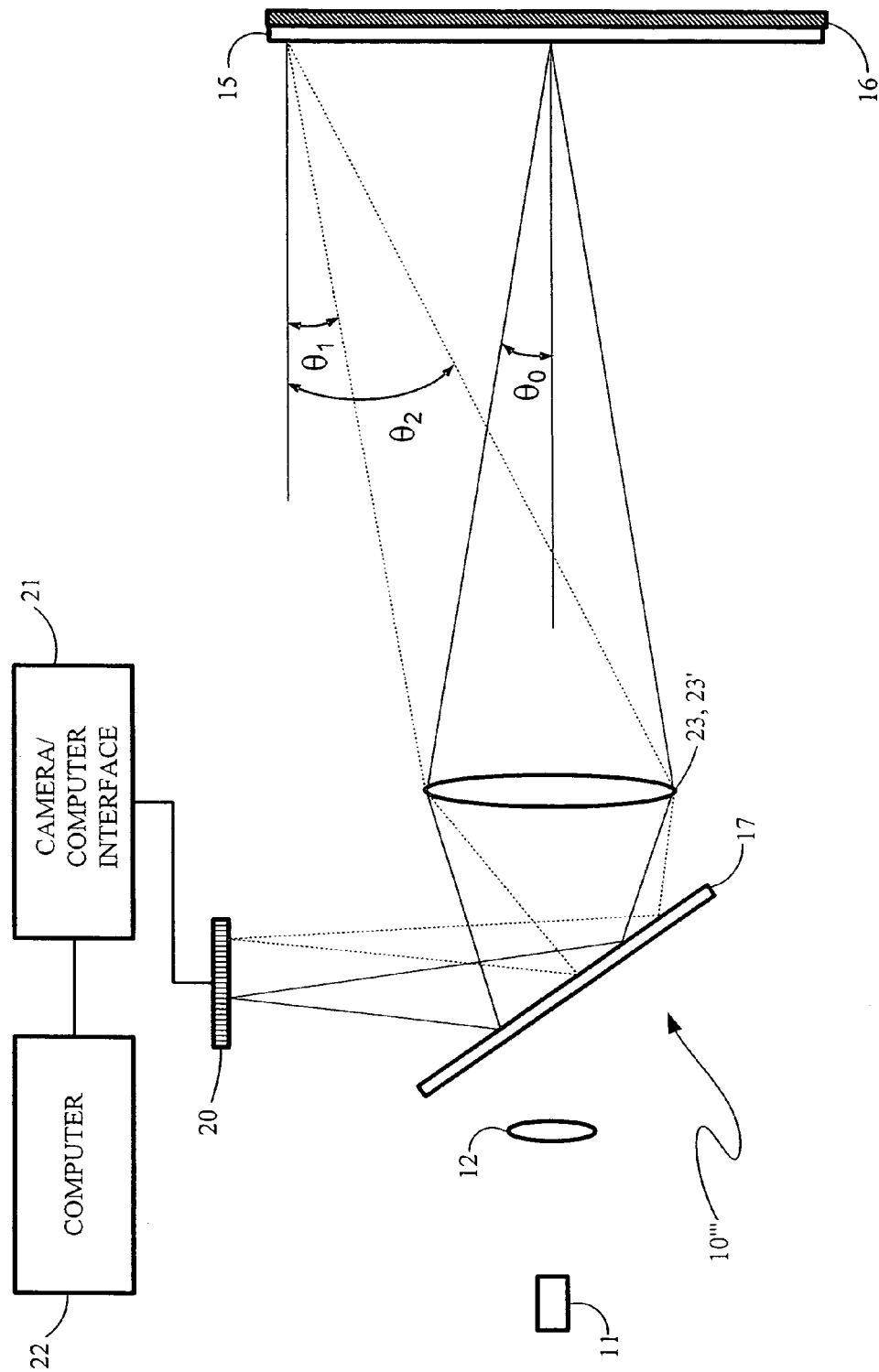

FIGS. 4A, 4B and 4C show yet a further embodiment the present specimen measurement system using a divergent beam configuration system, 10''', for reflected light measurements of parameters of specimen 15 supported on substrate 16. System 10''' does not require a large aperture lens or a large aperture mirror to illuminate the full specimen. This is because the illumination of specimen 15 in this embodiment is accomplished by use of a divergent illuminating light beam that reaches this specimen with a larger beam cross sectional area than the beam has upon emerging from the objective lens that is the last optical component in the illumination light path prior to the illuminating light reaching that specimen. That is, the aperture of the objective lens (which could instead be a mirror objective in a slightly altered but suitably configured system) can be substantially smaller than the aperture of the specimen.

FIGS. 4A and 4B show two alternative examples of configurations of an illumination optical system for system 10''' to provide a divergent illumination light beam arrangement. These alternative configurations involve different relationships between first illumination lens 12, a second illumination, or objective, lens, 23, and specimen 15 along the illumination optical path, the collection light path for the collection optical system provided not being shown in these figures. Other alternatives to generate a divergent illumination light beam to illuminate a relatively large specimen based on the use of an objective with substantially smaller aperture are also possible.

In the illumination optical system for system 10''' shown in FIG. 4A, first illumination lens 12 forms an image of source 11 at point P, which is inside the focal length of objective lens 23, e.g., the distance from P to the corresponding principal plane of lens 23 is smaller than the focal length of lens 23. In this way, the illuminating light beam, after passing through beamsplitter 17 and second illuminating, or objective, lens 23, will be divergent. When specimen 15 is placed at a sufficient distance from lens 23, the divergent beam reaching specimen 15 will cover the entire surface of that specimen. In this configuration, source 11 and point P are in conjugate positions, or in conjugate, and objective lens 23 does not form a real image of source 11.

In the alternative illumination optical system example shown in FIG. 4B for system 10''', first illumination lens 12 again forms an image of WL source 11 at point P but a different second illuminating, or objective, lens 23' is chosen to have a substantially shorter focal length than in the configuration of FIG. 4A. The combination of first illumination lens 12 and second illumination lens 23' forms a real image of WL source 11 also at point Q, e.g., WL source 11, point P and point Q are all in conjugate positions. The image of WL source 11 at point Q, however, is relatively far away from specimen 15. As a result, the convergent illumination light beam emerging from second illumination lens 23', after passing point Q, becomes a divergent illumination light beam. This result enables the illumination light beam reaching specimen 15 to illuminate a relatively large aperture specimen as explained above.

System 10''' configured with the illumination optical system of either of FIG. 4A or 4B is again shown in FIG. 4C with, however, the light illumination path for either of these configurations being omitted from the figure but, instead, with the light collection path being shown for the collection optical system that is useable with either of these illumination configurations. Second illumination or objective lens 23, 23' also serves as a first collection or, again, objective lens in being effectively a camera objective in the light collection path of the optical collection system further including beamsplitter 17 and CCD array 20. As shown in FIG. 4C, the surface of CCD array 20 and the surface of specimen 15 are in two conjugate planes. As a result, each pixel of CCD array 20 corresponds to a small area about a point on the reflecting surface of specimen 15. Thus, the reflected light from specimen 15 is collected in the collection optical system to be provided on the surface of CCD array 20 from which the corresponding reflectance spectral data can be obtained.

In comparison with systems 10, 10' and 10'' in FIGS. 1, 2 and 3, respectively, the clear advantage of system 10''' is its capability to illuminate a large aperture specimen using an objective with a substantially smaller aperture than that of such a specimen. Such an arrangement can result in substantial cost savings in being able to use smaller aperture optical components. In doing so, however, because CCD array 20 and specimen 15 must be in the conjugate positions, the working distance between the objective used and specimen 15 must be fixed. Furthermore, the data processing algorithms used in computer 22 will be more complex because at each point on the reflecting surface of the specimen the angle of incidence, or AOI, of the impinging illumination light is different from that at other such points. In addition, because specimen 15 is not illuminated by a collimated beam at each point on the plane of that specimen, the illumination beam is a light cone containing a range of AOIs defined by the numeric aperture, or NA, of objective lens 23, 23'. The reflectance resulting from these varying AOIs within this range must be integrated over those AOIs over the surface area being evaluated. Finally, the above integration range per pixel differs for points in and near the central region of specimen 15 from that at periphery of this specimen as indicated in FIG. 4C. As illustrated in FIG. 4C, in the center region of specimen 15, the light signal must be integrated over an angle of incidence range extending from $-\theta_0$ to $\theta_0$ but, in an edge region of specimen 15, the light signal must be integrated over an angle of incidence range extending from $\theta_1$ to $\theta_2$ which obviously differs from the angular range the light signal must be integrated over an angle of incidence range $-\theta_0$ to $\theta_0$.

Figure 5A:
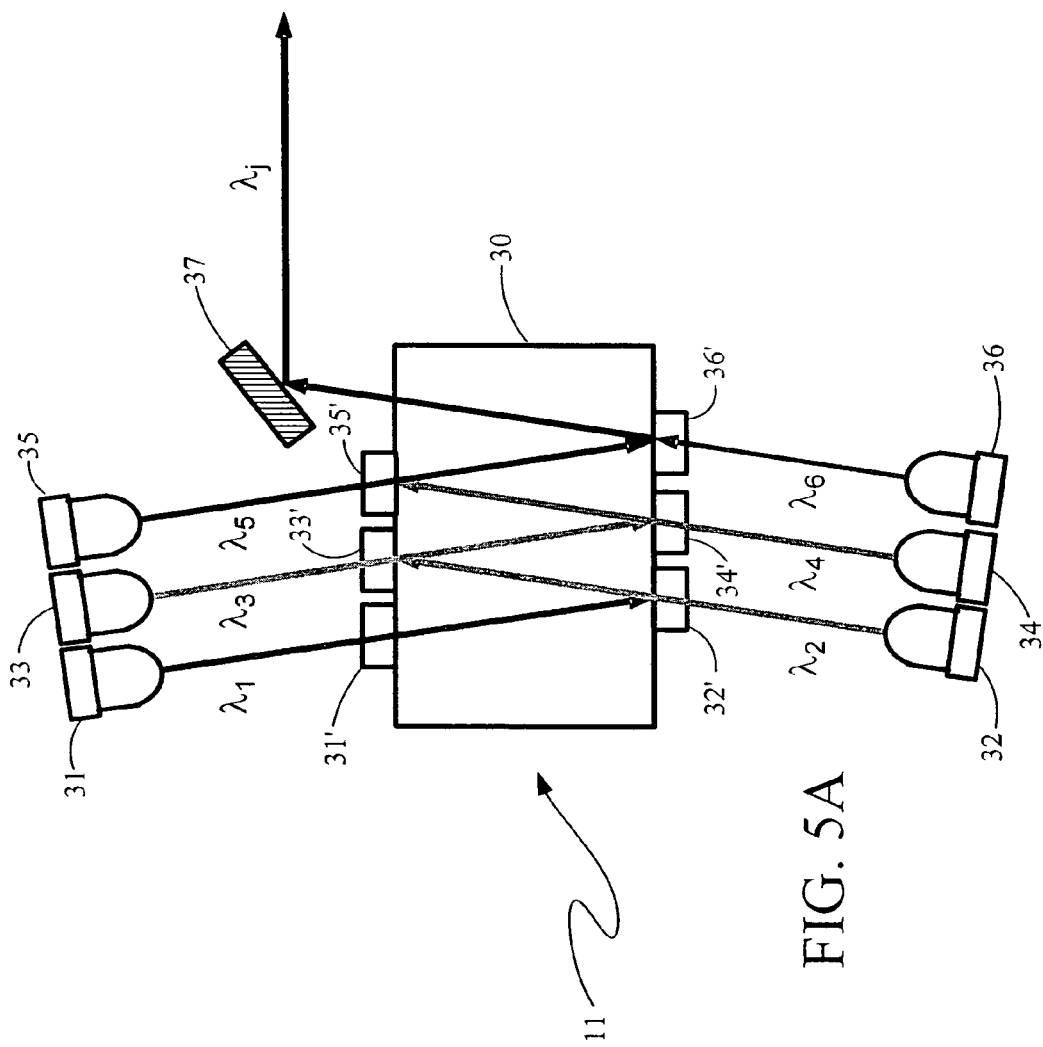
FIG. 5 shows a light source arrangement for a spectrometer in the present invention for use in light multiplexing and demultiplexing.
Figure 5B:
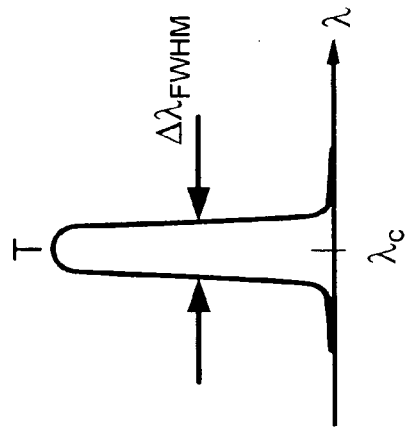

Now referring to FIG. 5A, a first arrangement is shown for light source 11 to allow combining light emitted by narrowband sources such as laser diodes, or LDs, or light-emitting diodes, or LEDs, perhaps also combined with optical interference transmission filters, to form an effective white light source. Current developments in fiber optic telecommunications equipment has significantly improved the performance of such optical interference transmission filters. As a result, relatively cheap, high performance, 100 GHz bandwidth thin-film filters are now commodity products supplied by many telecommunications components vendors. At a center wavelength of 1550 nm, the 100 GHz bandwidth of this kind of filter correspond to spectrum width of 0.8 nm. If directly shifted down in wavelength, into the visible light spectrum, for example, at a center wavelength $\lambda_c=600$ nm, a 100 GHz bandwidth will correspond to 0.12 nm linewidth such as is indicated by the full-width at half-maximum value spectral width measure, or FWHM spectral width, shown in FIG. 5B. In practice, depositing thin-films to form narrow bandpass filters, for instance, is possible so that they have a bandwidth of around a couple of Angstroms in the visible light portion of the electromagnetic wave spectrum. This bandwidth is, in fact, close to, or even less than, the linewidths provided by commercially available spectrometers having a diffraction grating as the light dispersion element.

FIG. 5A shows use of multiple laser diodes or light-emitting diodes ("LD/LEDs") each with a primary or center light emission wavelength that differs from that of the others for the light it emits on an optical path to a corresponding one of optical interference transmission filters mounted on opposite sides of a glass plate, 30. Thus, a first LD/LED, 31, provides emitted light that has a primary or center emission wavelength of $\lambda_1$ to a first optical transmission filter, 31', mounted on a first side of glass plate 30 along the optical path extending from LD/LED 31 to that filter at a first side angle of incidence with respect to the plate first side. Filter 31' is chosen to have its filter passband also centered at this same wavelength. Similarly, a second LD/LED, 32, provides emitted light that has a primary or center emission wavelength of $\lambda_2$ to a second optical transmission filter, 32', mounted on the opposite side of glass plate 30 along the optical path extending from LD/LED 32 to that filter at an opposite side incidence angle with respect to the plate opposite side that equals the first side incidence angle with its filter passband also being centered at this same wavelength.

A third LD/LED, 33, provides emitted light that has a primary or center emission wavelength of $\lambda_3$ to a third optical transmission filter, 33', mounted on the first side of glass plate 30 adjacent to filter 31' along the optical path extending from LD/LED 33 to filter 33' at the first side incidence angle with its filter passband also being centered at this same wavelength. Again, a fourth LD/LED, 34, provides emitted light that has a primary or center emission wavelength of $\lambda_4$ to a fourth optical transmission filter, 34', mounted on the opposite side of glass plate 30 adjacent to filter 32' along the optical path extending from LD/LED 34 to filter 34' at the opposite side incidence angle with its filter passband also being centered at this same wavelength.

Finally on the first side of glass plate 30, a fifth LD/LED, 35, provides emitted light that has a primary or center emission wavelength of $\lambda_5$ to a fifth optical transmission filter, 35', mounted on that plate adjacent to filter 33' in line with both of filters 31' and 33', this light again emitted along the optical path extending from LD/LED 35 to filter 35' the first side incidence angle with its filter passband also being centered at this same wavelength. Lastly on the opposite side of glass plate 30, a sixth LD/LED, 36, provides emitted light that has a primary or center emission wavelength of $\lambda_6$ to a sixth optical transmission filter, 36', mounted on that plate adjacent to filter 34' in line with both of filters 32' and 34', this light again emitted along the optical path extending from LD/LED 36 to filter 36' at the opposite side incidence angle with its filter passband also being centered at this same wavelength.

In FIG. 5A, there are shown 6 filters. However, this should not be regarded as the upper limit for the number of LDs/LEDs that can be used. Because high power LEDs are now commonly available, practically, there is no significant constraint on how many LEDs can be added in this fashion.

In operation, when LD/LED 31 is switched on to emit light at primary wavelength $\lambda_1$, that light impinges first on filter 31' and only light within the filter spectrum passband around center wavelength $\lambda_1$ thereof will pass through filter 31'. This passed portion of that light continues propagating along its light path across glass plate 30 to arrive at filter 32' positioned in this light path. Because filter 32' has a center wavelength $\lambda_2$, this filter serves as a mirror for the light primarily of wavelength $\lambda_1$ from LD/LED 31. Since the angle of incidence equals the angle of reflection, this reflected light primarily of wavelength $\lambda_1$ propagates to filter 33' where it is again reflected, and so on to all of the subsequent filters that will similarly serve as mirrors to this light. As a result, the light from the LD/LED 31, after passing through filter 31', will be reflected by all of the subsequent filters to propagate to an output mirror, 37, without substantial further loss. A similar result will obtain for LDs/LEDs 32, 33, 34, 35 and 36 in connection with the light emitted thereby around its primary wavelength and the corresponding initial filter provided therewith (32', 33', 34', 35' and 36', respectively), and with all subsequently encountered filters along the associated light path in glass plate 30 to these subsequent filters en route to output mirror 37.

If each of LDs/LEDs 31, 32, 33, 34, 35 and 36, or at least two of them, are switched on to emit light simultaneously, the emitted lights will be combined into a single beam past filter 36' to reach output mirror 37 to thereby provide an output light beam from source 11. If such LDs/LEDs have the currents therethrough modulated by corresponding information signals, source 11 can serve as a wavelength division multiplexer ("WDM") to allow forming a multiple wavelength information signal for transmission, typically, through an optical fiber. Here, however, light source 11 for the above described specimen measurement systems is a source with extremely high optical power efficiency and negligible optical power loss.

If, alternatively, these LDs/LEDs are selectively switched on and off individually, a light beam having the corresponding primary wavelength will be provided as the output beam of source 11. Each such LD/LED can be selectively switched on in a selected time sequence to emit light for a selected time duration before being switched off in favor of the next LD/LED to be switched on. In this way, at a given point in time, CCD array 20 will receive a substantially single-wavelength light signal corresponding to the primary or center wavelength of the light being emitted by the LD/LED that has been switched on. As each LD/LED is sequentially switched on one after the other, a set of light signals spanning a selected spectrum is obtained over the range of primary wavelengths available from the selection of LDs/LEDs used in source 11. This combination of one LD/LED being switched on at a time, or of some or all the LDs/LEDs being simultaneously switched on at a time, in selected sequences allows realizing fast, relatively cheap, and robust spectrometric measurements. Again, if such LDs/LEDs have the currents therethrough modulated by corresponding information signals, source 11 can serve as a time-division multiplexer ("TDM") to allow sending multiple information signals in corresponding time slots for transmission, typically, through an optical fiber.

Figure 6:
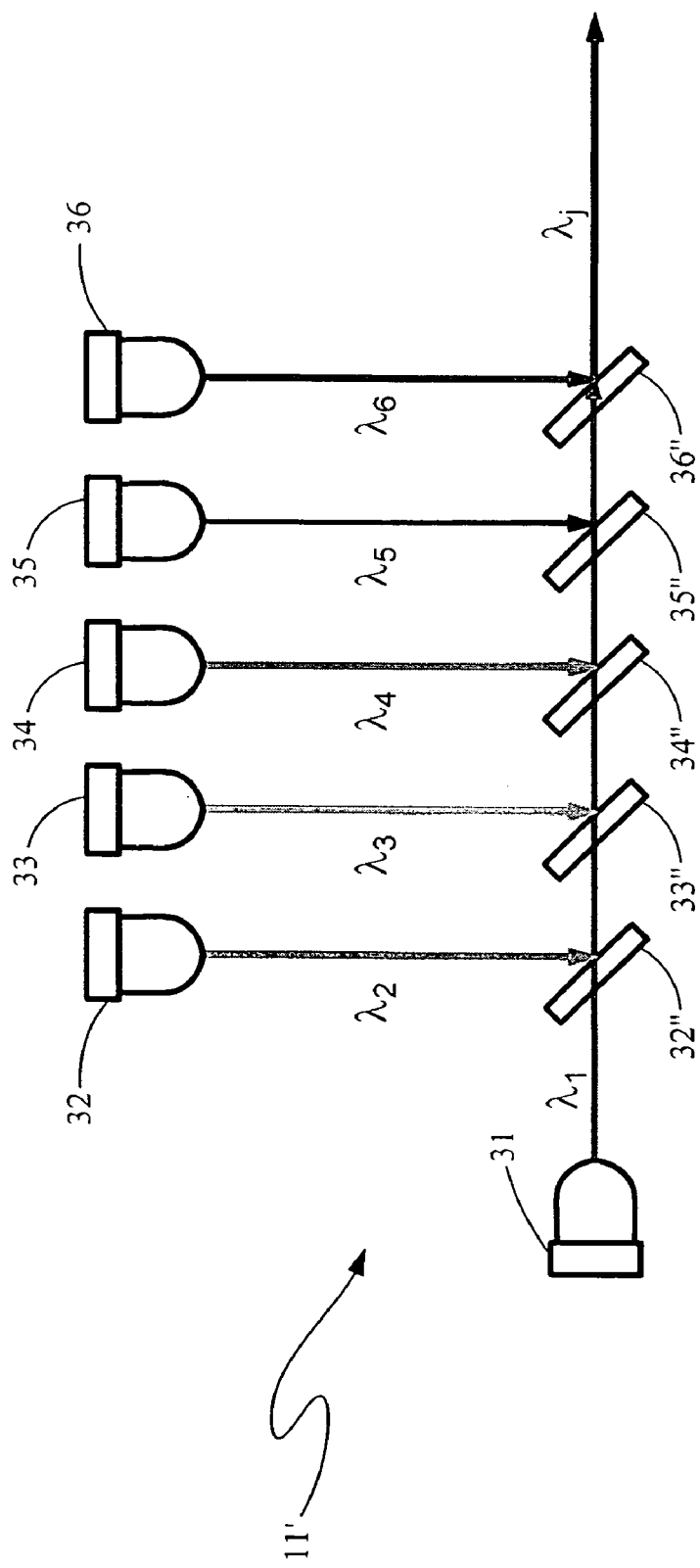
FIG. 6 shows a light source arrangement for a spectrometer in the present invention for use in light multiplexing based on beamsplitters or dichroic mirrors.

FIG. 6 shows an alternative arrangement, 11', for source 11 which shows that, in the absence of a need to combine a relatively large number of LDs/LEDs, the narrow bandpass filters can be replaced with other optical components for dividing light beams into two or more parts such, for example, as beamsplitters, dichroic mirrors, lowpass filters or highpass filters. Here, beamsplitters or dichroic mirrors, 32", 33", 34", 35" and 36", replace narrow bandpass filters 31', 32', 33', 34', 35' and 36' of FIG. 5A but with the limitation that only a relatively few LDs or LEDs can be used because of the power losses encountered in using such substitutes in this arrangement in which the emitted light from some LDs or LEDs pass through several of these substitutes. In FIG. 6, the light emitted from LD/LED 31 with wavelength $\lambda_1$ undergoes the largest loss in passing through all of the substitutes. For instance, suppose each beamsplitter or dichroic mirror has the same 50/50 light splitting characteristic (i.e., the reflectance R and the transmittance T are equal or R=T=50%), then only 3% of the power of the light emitted from LD/LED 31 will arrive at the source output. The power of the light emitted by LD/LED 32 will be reduced to 6.3% of its emitted value at the source output, the power of the light emitted by LD/LED 33 will be reduced to 12.5% of its emitted value at the source output, etc., until LD/LED 36 is considered which only loses half of its emitted light power at the output. As a result, a reasonable arrangement has as LD/LED 31 as the one with the highest emitted light power in having to pass through all of the beamsplitters or dichroic mirrors, LD/LED 32 as the one with the next highest emitted light power, and so on through LD/LED 36. In operation, the same methods described above in connection with FIG. 5A can be used in collecting spectrometric data.

Figure 7:
FIG. 7 shows a light source arrangement for a spectrometer in the present invention for use in light multiplexing based on an optical fiber cross-section converter.

FIG. 7 shows another arrangement designated 11" for source 11 using a fiber optic cross section converter, which is commercially available device, for example from Tec5/Hellma. LDs/LEDs 31 through 36, not shown here, are each coupled to one end of a corresponding one of a set of optical fibers, 31''', 32''', 33''', 34''', 35''' and 36''', so that emitted light from each LD/LED of a corresponding wavelength enters the optical fiber to which it is coupled. These optical fibers are then combined at the opposite ends to form a fiber bundle mixer, 38, with a mixing cross section that combines the light from all incoming optical fibers and uniformly distributes the intensity over the exit optical fiber, 39, of the cross section converter. When LDs/LEDs 31 through 36 are switched on to emit one after another, the cross section converter assures that the position of the effective light source for different wavelengths, i.e. the end of the exit optical fiber, will not change with respect to the subsequent portions of the optical system. In this way, the optical system alignment will not be affected by selecting different ones of LDs/LEDs 31 through 36 to be switched on. In addition, the loss for each wavelength is mainly determined by characteristics of each individual fiber, which, in turn, can be controlled and usually is negligible.

In the arrangements shown in FIGS. 6 and 7, the light emitted from LDs/LEDs 31 through 36 is directly used to perform spectrometric measurements without the insertion of other optical components in the light paths other than the light transmission control components, that is, the beamsplitters, dichroic mirrors, and the optical fibers and mixer which depend little on the light wavelengths in the configurations shown. The linewidths or bandwidths of LDs are sufficiently narrow for them to be regarded as single-wavelength sources. However, because of the finite spectrum width of LED light (as described above, the FWHM of LED is commonly in the range of 20-100 nm), LEDs cannot be regarded as single-wavelength light sources. To determine characteristics of specimens from the spectrometric data gathered therefrom, either additional configuration structure arrangements or data processing means, or both, are needed to extract the desired information from such data for each specimen. Perhaps the simplest addition is to insert the narrow bandpass filters 31', 32', 33', 34', 35' and 36' of FIG. 5 in front of each corresponding one of LEDs 31, 32, 33, 34, 35 and 36, as shown in a further arrangement, 11'''', for source 11 in FIG. 8 in providing such additions to the system shown in FIG. 6. In this way, the emitted light beam passing through the filter from its corresponding LED is converted into a single-wavelength light beam. When LEDs 31, 32, 33, 34, 35 and 36 are switched on to emit light one after another, a signal corresponding to each individual wavelength is obtained. Comparing with the system shown in FIG. 5A, this arrangement of FIG. 8 uses off-the-shelf components and does not require specially designed light combining assembly to provide a common light output path.

Figure 8:
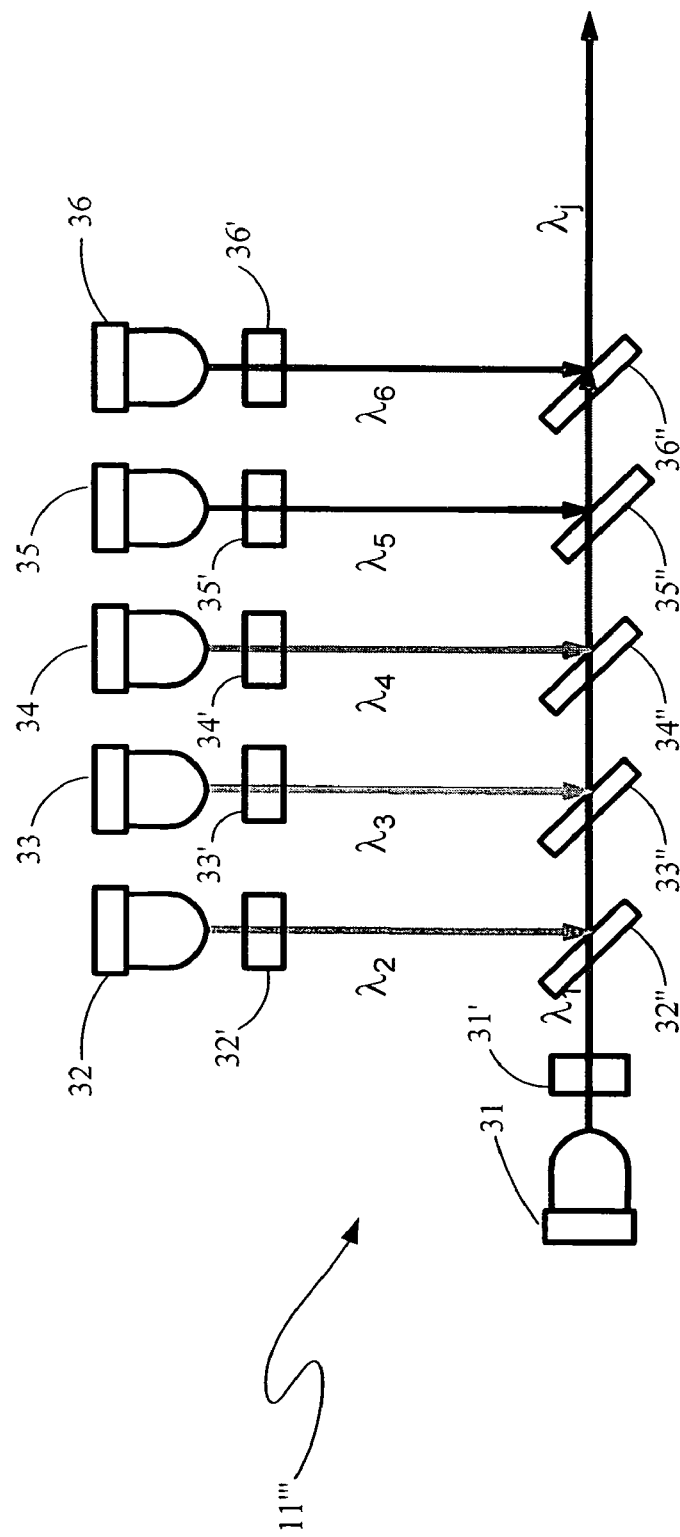
FIG. 8 shows a light source arrangement for a spectrometer in the present invention for use in light multiplexing based on thin-film filters and beamsplitters or dichroic mirrors.

There is substantial flexibility in the temporal switching of light of differing wavelengths, and in the common output path combining of light of differing wavelengths, in the above described alternatives for source 11. In the source arrangement shown in FIG. 5, narrow bandpass filters are used for the common output path light combining operation and for temporal switching operation. On the other hand, in the beamsplitter or dichroic mirror embodiments, the common out path light combining operation and the light temporal switching operation can be performed with narrow bandpass filters, as shown in FIG. 8, or without such filters, as shown in FIG. 6. If those filters are used, the output light beam (which is used as the probe beam to illuminate the specimen under test in the systems described above using source 11) will have a narrow bandwidth, and may be considered as monochromatic light. If, however, those filters are not positioned in front of each LED, as shown in FIG. 6, the output light beam will have a finite bandwidth, typically in the 20 to 50 nm range. In this latter circumstance, the probe light beam cannot be considered as a single-wavelength light beam. Instead, the light impinging on, and reflected from, specimens under test has a finite bandwidth that must be taken into account in obtaining the corresponding desired spectrographic data.

Figure 9:
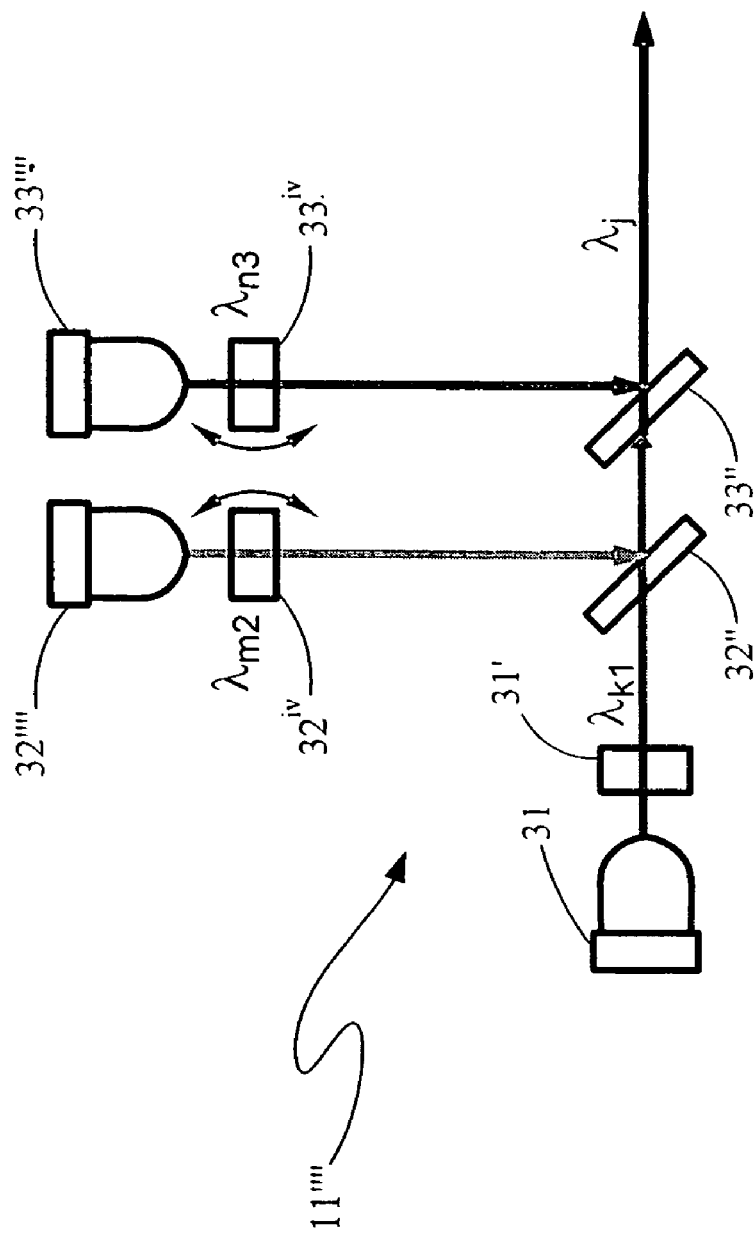
FIG. 9 shows a light source arrangement for a spectrometer in the present invention for use in light demultiplexing based on tunable narrow bandpass filters.

FIG. 9 shows another arrangement, 11''''', for source 11 providing both fixed and continuously variable center wavelength selections for the light provided at the source output from the light emitted by the LEDs used therein. In this arrangement, an LED 31 (or more than one), having a typical relatively wide light emission spectral wavelength range, and also LEDs, 32'''' and 33'''', having relatively wide light emission spectral wavelength ranges, wide enough to be considered white light LEDs, have the filtered light emissions therefrom combined by beamsplitters or dichroic mirrors 32'' and 33''. Fixed position narrow bandpass filter 31' is positioned in front of LED 31 as before, but narrow bandpass filters, 32$^{iv}$ and 33$^{iv}$, positioned in front of LEDs 32'''' and 33'''', respectively, are each mounted in those positions on a rotatable support. If either of filters 32$^{iv}$ and 33$^{iv}$ is slightly rotated with respect to its corresponding LED through rotation of its support, the angle of incidence is changed of the light impinging thereon emitted from the corresponding one of LEDs 32'''' and 33'''' from what that angle was prior to such a rotation. Because of the behavior of interference filters 32$^{iv}$ and 33$^{iv}$ for light incident thereon at oblique angles, such changes in the angles of incidence of light thereon will cause a corresponding change of the center wavelength of the passband of that filter. Thus, the center wavelength of the illumination passing from filters 32$^{iv}$ and 33$^{iv}$ can be selectively changed to the extent desired over a range of wavelengths. The LEDs here again can be switched on either sequentially one by one or concurrently in any combination or succession of combinations.

Figure 10:
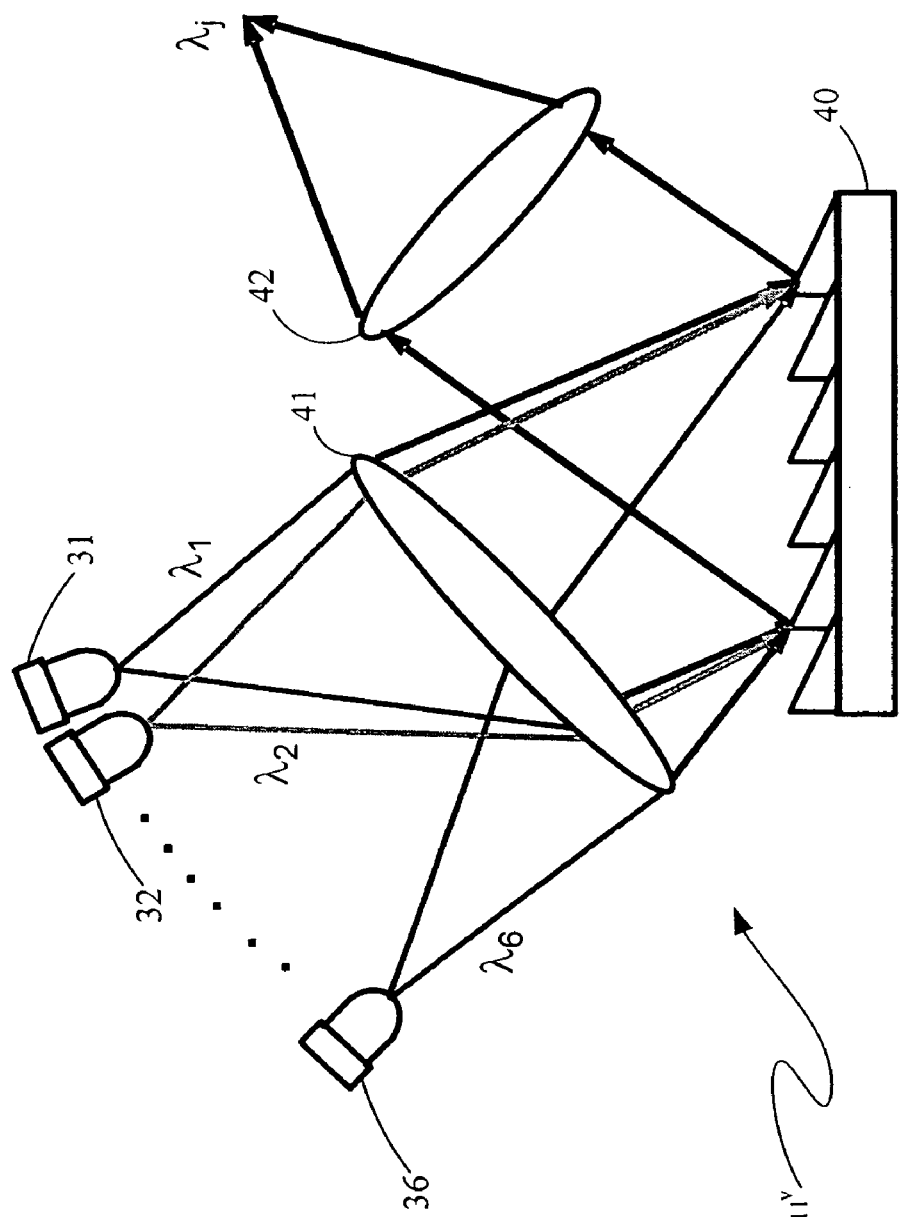
FIG. 10 shows a light source arrangement for a spectrometer in the present invention for use in light multiplexing and demultiplexing based on a blazed grating.
Figure 11:
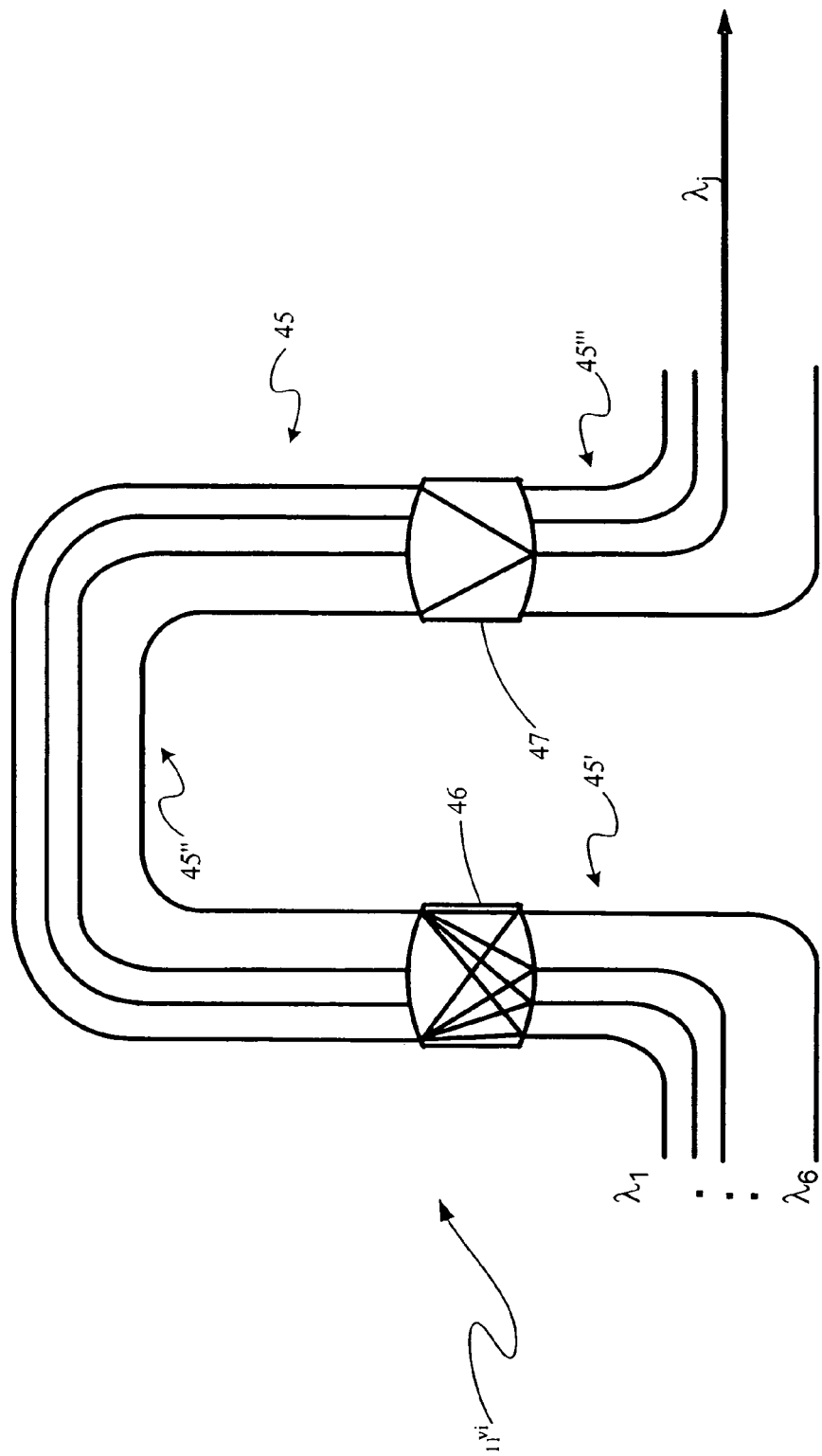
FIG. 11 shows a light source arrangement for a spectrometer in the present invention for use in light multiplexing based on an array waveguide gratings ("AWGs")

FIGS. 10 and 11 show two other arrangements, 11$^v$ and 11$^{vi}$, for the LDs/LEDs in source 11 to be switched on either sequentially one by one or concurrently in any combination or succession of combinations to thereby provide narrow band light beams with exactly defined wavelengths at the source output. In FIG. 10, a blazed grating, 40, is used to direct to the source output light of differing wavelengths $\lambda_j$ emitted from corresponding ones of LDs/LEDs 31 to 36 (only some of which are shown) positioned at differing angles with respect to the normals to the grating facets faces or to the normal to the general plane of the grating. The emitted light from LDs/LEDs 31 to 36 is provided to grating 40 through a source illumination lens, 41, to thereby impinge thereon. The emitted light, if from LEDs, can be first passed through corresponding narrow passband filters as before although such filters are not shown here. The emitted light reflected from grating 40 is collected by a source collection lens, 42, for provision to the source 11$^v$, i.e. source 11, output.

Since light from any one of LDs/LEDs 31 to 36 is directed to the source 11$^v$ output independently of the light impinging thereon from any of others, there is no accumulated light loss as more and more light sources are added. Apart from practical space limits on the number of LDs/LEDs used, there is no limit to the number of light sources to be multiplexed as there is in some of the previous arrangements shown for source 11 that use film bandpass filters and beamsplitters. In practical operation, each light source with specific wavelength $\lambda_j$ is specifically arranged, with the angle of incidence $\theta_j$ (i.e., the angle between the path of the light beam emitted from a corresponding one of LDs/LEDs 31 to 36 and the normal to the general plane of the grating) and the angle of collection $\theta_c$ (i.e., the angle between the optical axis of the collection lens and the normal to the general plane of the grating) being set through use of the grating equation $$\sin\theta_c = \sin\theta_j + \frac{\lambda_j}{p},$$

where p is the period of the grating. Thus, in switching on LDs/LEDs 31 to 36 alternatively and sequentially, lens 42 allows emitted light of a specific wavelength to be collected and directed to the source 11$^v$ output to illuminate specimen 15 by various light beams of different wavelengths. If switching on all, or some combination, of LDs/LEDs 31 to 36 concurrently, all wavelengths of the emitted light will pass to the source 11$^v$ output with negligible losses. These capabilities give rise to maximum flexibility in performing spectrometric measurements.

Source 11$^{vi}$ as shown in FIG. 11 again has LDs/LEDs 31 to 36, though not shown, to provide emitted light to the left ends of a group of curved channel waveguides, 45. Once again, the emitted light, if from LEDs, can be first passed through corresponding narrow passband filters as before although such filters are also not shown here. Waveguides 45 are formed of a dielectric material having a certain refractive index that are embedded in a slab of dielectric material of a lower refractive index with these waveguides generally being confined to being within planes through the slab parallel to a major surface of that slab. Because of such channel curvature, there is an optical path length difference between two adjacent channels that is fixed.

Near both of the input and output ends of the channel waveguides, these channel waveguides intersect in their optical paths curved surfaces extending perpendicular to the major surfaces of the slab that form opposite sides of an input cavity, 46, and an output cavity, 47, respectively, these curved surfaces acting as focusing mirrors as shown in FIG. 11. LDs/LEDs 31 through 36, having various center wavelengths, are coupled to input cavity 46 via a group of inlet waveguides, 45', as a portion of channel waveguides 45, with these inlet waveguides intersecting an adjacent curved surface of input cavity 46.

In input cavity 46 the incoming light emitted by any of LDs/LEDs 31 through 36 is diffracted to be distributed to each of a group of curved intermediate waveguides, 45", as another portion of channel waveguides 45, intersecting the adjacent curved surface on the opposite side of that cavity and being of equal number to inlet waveguides 45'. The optical path length differences between adjacent ones of intermediate waveguides 45" results in a fixed phase delay between the light propagating in adjacent intermediate waveguides.

Intermediate waveguides 45" also intersect an adjacent curved surface of output cavity 47. When the light in each of intermediate waveguides 45" arrives at output cavity 47, constructive interference between the light from different ones of intermediate waveguides 45" of differing wavelengths and delays will occur at specific locations in output cavity 47. Outlet waveguides, 45''', as a further portion of channel waveguides 45 and equal in number to intermediate waveguides 45", intersect the adjacent curved surface on the opposite side of output cavity 47 to thereby allow obtaining the source output light from individual ones of LDs/LEDs 31 through 36, or from combinations thereof. This arrangement also allows the unlimited addition of further LDs/LEDs (except for practical packing limitations) which will not accumulate losses as more such LDs/LEDs are added. Here too, LDs/LEDs 31 through 36 can be switched on alternatively and sequentially to enable providing source output light of various wavelengths in a time sequence, or all or any combination of them may be switched on concurrently.

If narrow bandpass filters are not used in source 11 in specimen measurement systems 10, 10', 10" and 10''' described above in conjunction with LEDs when such LEDs are used therein to provide the illuminating light, the information extraction from the resulting photovoltage signals obtained in CCD array 20 to determine the desired spectrographic data must be performed in computer 22 using suitable signal processing methods such as that described in what follows. Let $P_{Source}(\lambda)$ represent the power spectral density or power spectrum of the light emitted by an LED in source 11. Further, let $R_{Sample,k}(\lambda)$ represent the spectral reflectance across the surface of the $k^{th}$ test site in specimen 15, as a sample, which will give rise to a power spectral density or power spectrum, $P_{Sample,k}(\lambda)$, of the light signal generated by a sample of the light obtained from the sample $k^{th}$ test site on specimen 15 in the reflected light collection system as a result of the incident illuminating light being reflected from, and over, that site. Generally, an LED is known to have an emission power spectrum that can be approximated as a Lorentzian spectral distribution, or $$P_{Source}(\lambda) = \frac{P_c \Delta \lambda_{FWHM}^2}{(\lambda - \lambda_c)^2 + \Delta \lambda_{FWHM}^2},$$

where $P_c$ is the peak light power density, $\lambda_{FWHM}$ is the full wavelength width of the distribution at half of the distribution maximum value, and $\lambda_c$ is the center wavelength of the distribution. The total light power of the signal, $S_{Total,k}$, received by the pixels in CCD array 20 for that sample test site is then given by $$S_{Total,k} = C \int_{-\infty}^{\infty} R_{Sample,k}(\lambda) P_{Source}(\lambda) d\lambda$$

where C is a constant representing the losses due to the beamsplitters and the like in the illumination and collection systems. $S_{Total,k}$ must also equal $P_{site}(k)$ previously set out above as equations similar to the foregoing can be written for each test site portion corresponding to each pixel in CCD array 20 to which the $k^{th}$ test site on specimen 15 is mapped by the optical measurement system collection system, and then summed over those pixels corresponding to that site.

Under ideal conditions, the sample of light taken from the sample $k^{th}$ test site is based on illumination of that site by a single-wavelength source, and the source power spectrum can then be represented as a Dirac δ-function rather than as a Lorentzian distribution. In such circumstances, the light signal resulting from this light sampling of the sample $k^{th}$ test site, that is detected by the pixels in CCD array 20 to which this $k^{th}$ test site is mapped by the optical measurement system collection system, follows exactly the power spectrum shape generated solely by the reflectance characteristics of specimen 15 at that sample $k^{th}$ test site as reduced by the system loss constant. In practice, because of the finite bandwidth of LED light emissions, as indicated by the Lorentzian distribution given above, the source power spectrum will have non-negligible value over some range of wavelengths, $\lambda_1 \leq \lambda \leq \lambda_2$, usually centered around the corresponding distribution center wavelength $\lambda_c$.

Typically, the range of non-negligible wavelengths in an LED power spectrum can be approximated as occurring between the range endpoints of $\lambda_1 = \lambda_c - 2\Delta\lambda_{FWHM}$ and $\lambda_2 = \lambda_c + 2\Delta\lambda_{FWHM}$. The light signal actually detected at the pixels in CCD array 20 to which the $k^{th}$ test site is mapped by the collection system in the optical measurement system, therefore, is based on the average over that site of the power spectrum of the sampling illumination light from source 11 as reflected from that site averaged over wavelengths within this range, but as weighted by the source power spectrum over this range. If, instead, a single-wavelength source is used to represent source 11 with its source power spectrum represented as a Dirac δ function based on the distribution center wavelength to represent the sampled light signal, errors in the measured specimen reflectance characteristics will inevitably result. However, accurate reflectance characteristics of any specimen 15 can still be extracted from the light signals detected at CCD array 20 when unfiltered LED emission light is provided by source 11 through the following data processing method for each test site implemented in computer 22.

This data processing method is based on the well known Mean Value Theorem for Integration from real variable calculus. According to this theorem, because in the range $-\infty < \lambda \leq \lambda_c$, the source spectrum $P_{Source}(\lambda)$ is non-decreasing, the integration, therefore, can be expressed as $$\int_{-\infty}^{\lambda_c} R_{Sample,k}(\lambda) P_{Source}(\lambda) d\lambda = P_{Source}(\lambda_c) \int_{\Lambda_1}^{\lambda_c} R_{Sample,k}(\lambda) d\lambda$$

where $\Lambda_1 > -\infty$. Because the power of the light source is negligible outside its emission spectrum range, the above integration can be performed in the spectrum range $\Lambda_1 \geq \lambda_1$. Similarly, because in the $$S_{Total} = C \int_{-\infty}^{\infty} R_{Sample,k}(\lambda) P_{Source}(\lambda) d\lambda$$

range $\lambda_c \leq \lambda < \infty$, the source spectrum $P_{Source}(\lambda)$ is non-increasing, the integration can be expressed as $$\int_{-\infty}^{\infty} R_{Sample,k}(\lambda) P_{Source}(\lambda) d\lambda = P_{Source}(\lambda_c) \int_{\lambda_c}^{\Lambda_2} R_{Sample,k}(\lambda) d\lambda$$

where $\Lambda_2 < \infty$, and for the same reason given above, $\Lambda_2 \leq \lambda_2$. Combining the above results in accord with the calculus of real variables, the detected total light power signal $S_{Total,k}$ received by the pixels in CCD array 20 in the sample $k^{th}$ test site is obtained in the form $$\approx CP_{Source}(\lambda_c) \int_{\Lambda_1}^{\Lambda_2} R_{Sample,k}(\lambda) d\lambda$$

$$\approx CP_{Source}(\lambda_c) \int_{\lambda_c - \Delta\lambda_{FWHM}}^{\lambda_c + \Delta\lambda_{FWHM}} R_{Sample,k}(\lambda) d\lambda$$

where differences in detectivity at each array pixel have been ignored in anticipation of such differences being cancelled out in further manipulations by results normalization.

In practical implementation of the above signal process method, sample specimens with known reflection characteristics must be used in specimen measurement systems 10, 10', 10" and 10'" described above, when LEDs are used therein to provide unfiltered illuminating light in sources 11 therein, as the basis for calibrating the bandwidths of such LEDs. Although for commercially available LED products, typical spectral emission characteristics are measured and provided, there are, nevertheless, two reasons making the above mentioned calibration necessary. First, for each individual LED, the actual spectral emission characteristic thereof may deviate from manufacturer's provided typical spectral emission characteristics. Furthermore, the spectral emission characteristics of the emitted LED light, after propagating through the optical system, may be slightly modified either because of reflection from optical surfaces or because of transmission through optical components, or both, due to the optical characteristics of such surfaces or components. These kinds of emitted light variations allow no objective criteria to provide a basis for deciding just what the LED bandwidths were from the light arriving at CCD array 20 and, thus, calibration is needed.

Such calibration is based on fitting the light signals at various wavelengths measured at CCD array 20 after reflection from specimen samples of known reflectance characteristics to the signal processing results found above. Various examples of such calibrations are given in the following in connection with specimen measurement systems used in semiconductor metrology. However, the calibration methods shown in these examples are not limited to semiconductor metrology applications.

The initial calibration example uses a blank silicon wafer not having undergone direct integrated circuit device fabrication steps as the reference standard specimen for this calibration. Typically, source 11 in a specimen measurement system has N LEDs therein, each having a center wavelength $\lambda_{cj}$ and bandwidth $\Delta\lambda_{cj}$, j=1, 2, ... N. Calibration to determine the bandwidths $\Delta\lambda_j$ for each of the N LEDs requires using that specific specimen measurement system to measure the light signal power at each of the pixels corresponding to the $k^{th}$ test site in CCD array 20 (a) ideally resulting from the use of a mirror having a substantially constant reflectance thereacross as specimen 15 rather than the blank silicon wafer to determine the power of the incident light from source 11 reflected from the mirror to thereafter reach the array, $S_{Ij}$, so that specimen reflectance characteristics do not influence this result, and also (b) resulting from the use of the blank silicon wafer as specimen 15 to determine the power of reflected light impinging on the array, $S_{Rj}$, with the blank silicon wafer specimen reflectance characteristics influencing the result. As a practical matter, a mirror is not used in the measurement of (a) but instead the incident light power is measured for example by positioning a collection lens to the right of large beamsplitter 13 in the specimen measurement system of FIG. 1 along with a detector to measure the power of the collected light and using the measured reflectance of that beamsplitter to account for further reflections therefrom in finally determining the measured value of the incident light. The ratio of these two light powers defines the measured spectral reflectance of the blank silicon wafer averaged over the bandwidth of each LED so measured at the $k^{th}$ test site.

In addition, the spectral reflectance averaged over the LED emission wavelength range from $\lambda_1$ to $\lambda_2$ given above for each of the N LEDs involving light reflected from the blank silicon wafer can be calculated based on a theoretical model using the results derived above. Assuming the illuminating light from source 11 impinges on the blank silicon wafer at normal incidence, and using the Mean Value Theorem for Integration again as above to allow representing this illuminating light as having a light power equal to $2P_{Source}(\lambda_{cj})\Delta\lambda_j$ so that it can be expressed as a source power spectral density at the distribution center wavelength being uniformly distributed over the assumed source wavelength range of $2\Delta\lambda_j$, the calculated spectral reflectance averaged over the LED emission wavelength range is then given for the $k^{th}$ test site by $$\langle R_j \rangle = \frac{\int_{-\infty}^{\infty} CP_{Source}(\lambda_{cj}) R_{Si}(\lambda) d\lambda}{\int_{-\infty}^{\infty} CP_{Source}(\lambda_{cj}) d\lambda} \approx \frac{P_{Source}(\lambda_{cj}) \int_{\lambda_{cj}-\Delta\lambda_j}^{\lambda_{cj}+\Delta\lambda_j} R_{Si}(\lambda) d\lambda}{2P_{Source}(\lambda_{cj})\Delta\lambda_j} = \frac{1}{2\Delta\lambda_j} \int_{\lambda_{cj}-\Delta\lambda_j}^{\lambda_{cj}+\Delta\lambda_j} R_{Si}(\lambda) d\lambda$$

using the equation derived above for $S_{Total,k}$ and expressing the reflectance from the blank silicon wafer as $$R_{Si}(\lambda) = \frac{[n_{Si}(\lambda) - 1]^2 + k_{Si}^2(\lambda)}{[n_{Si}(\lambda) + 1]^2 + k_{Si}^2(\lambda)},$$

with $n_{Si}(\lambda)$ and $k_{Si}(\lambda)$ being the silicon material refractive index and extinction coefficient spectra. Silicon is one of the most widely studied materials. The tabulated $n_{Si}(\lambda)$ and $k_{Si}(\lambda)$ data, as well as the dispersion models for silicon, are available from most published documents, for instance, from *Handbook of Optical Constants in Solids* Volume I, edited by Edward D. Palik, Academic Press, 1985, page 555. With the known $n_{Si}(\lambda)$ and $k_{Si}(\lambda)$ data, the half bandwidths $\Delta\lambda_j$ for each LED, j=1,2, . . . N, can be solved for by using the following equations. These equations are formed for the $k^{th}$ test site by using the reflectance for a blank silicon wafer and setting, for each LED, the resulting calculated averaged spectral reflectance $<R_j>$ equal to the measured spectral reflectance of the blank silicon wafer averaged over the bandwidth of each LED determined by the ratios $S_{Rj}/S_{Ij}$. These ratios are the ratios of (a) the measured value for each LED of the impinging light power $S_{Rj}$, for reflected light impinging on a detector with the blank silicon wafer specimen reflectance characteristics influencing the result, to (b) the corresponding measured value for each LED of the incident light power $S_{Ij}$, for reflected light impinging on a detector without the blank silicon wafer specimen reflectance characteristics influencing the result, or $$\frac{S_{Rj}}{S_{Ij}} - \frac{1}{2\Delta\lambda_j} \int_{\lambda_{cj}-\Delta\lambda_j}^{\lambda_{cj}+\Delta\lambda_j} \frac{[n_{Si}(\lambda) - 1]^2 + k_{Si}^2(\lambda)}{[n_{Si}(\lambda) + 1]^2 + k_{Si}^2(\lambda)} d\lambda = 0, \quad j = 1, 2, \ldots, N.$$

Forming the ratios $S_{Rj}/S_{Ij}$, i.e. normalizing the measured data, eliminates the consequences of pixel to pixel variations in CCD array 20 to the precision of the measurement as indicated above. Similarly, there is no need to measure the spatial power distribution of the illumination beam for each of the other LDs/LEDs switched on within source 11 for measurements to determine variations in light power therein over the surface of specimen 15 which would otherwise be needed to compensate for the consequences of such variation to the precision of the measurement. The above equations are solvable since there are N equations to be solved for N unknowns and, in fact, each of the N equations for a corresponding $j^{th}$ one of the N LDs/LEDs has a single unknown, $\Delta\lambda_j$. Thus, the bandwidth of each of the LDs/LEDs switched on within source 11 for these measurements can be determined based on the use of a single standard reference, the single blank silicon wafer.

The inconvenience of the measurement of the incident light on the specimen described above can be eliminated, and the accuracy of LED bandwidth calibration can be improved by using more than one standard reference specimen in an otherwise similar calibration process. As a further example, consider using a series of M additional specimens in addition to the blank silicon wafer together as a set of standard specimen references. These M specimens are also fabricated from blank silicon wafers but are each provided with an additional silicon dioxide, or $SiO_2$, film of various thicknesses $t_m$, m=1, 2, . . . M, that are thermally deposited to the corresponding selected thickness onto a major surface of these additional silicon wafers which thus serve as substrates for these added oxide film layers. Each standard specimen reference in the set, and the initial blank silicon wafer, is measured by the same specimen measurement system using the same source 11 with the same LEDs therein to thereby have the same corresponding bandwidth $\Delta\lambda_j$ for each LED used. The corresponding light power signals are again obtained for each LED in source 11 at the $k^{th}$ test site but here repeatedly using each standard reference specimen. Thus, for example, $S_{mj}$ represents the spectral power light signal measured using both standard reference specimen m in the set thereof and LED j in source 11, and $S_{Sij}$ represents the spectral power light signal measured using both the blank silicon wafer standard reference specimen and LED j in source 11.

Here again, the reflectance of light impinging on an oxide, or dielectric, film layer, each of a corresponding thickness $t_m$ in the $m^{th}$ standard reference specimen, that is supported on a corresponding silicon wafer substrate can be calculated using the Airy reflectance formula for each standard reference specimen as $$R_m(\lambda) = \left| \frac{r_1 + r_2 \exp(i4\pi n_f t_m/\lambda)}{1 + r_1 r_2 \exp(i4\pi n_f t_m/\lambda)} \right|^2, \quad m = 1, 2, \ldots, M,$$

where $n_f$ is the refractive index of the oxide film layers, and the reflection coefficients $r_1$, and $r_2$ corresponding to the light reflected from the air/film and film/substrate interfaces, respectively, are given by $$r_1 = \frac{1 - n_f}{1 + n_f}$$

and $$r_2 = \frac{n_f - n_{Si} - ik_{Si}}{n_f + n_{Si} + ik_{Si}}.$$

The spectral reflectance averaged of the power light signals over the LED emission wavelength range, using the corresponding equation obtained above for calibrating the LED bandwidths using just a single blank silicon wafer, can be expressed for the $k^{th}$ test site as $$P_{Source}(\lambda_{cj}) \int_{\lambda_{cj}-\Delta\lambda_j}^{\lambda_{cj}+\Delta\lambda_j} R_m(\lambda) d\lambda.$$

The LED bandwidths can then be determined by fitting the above calculated average spectral reflectance signals for each oxide layered standard reference specimen, as normalized by the calculated average spectral power signals for the blank silicon wafer standard reference specimen, to the measured average spectral reflectance signals $S_{mj}$ as measured at the $k^{th}$ test site from the standard reference specimens with silicon dioxide films thereon, as normalized by the measured average spectral power signals $S_{Sij}$ for the blank silicon wafer, using the well known least-squares fitting technique. In doing so, a target function $f(\vec{x})$ is defined by using the reflectances for oxide layered silicon wafers and forming the difference, for each LED, between the resulting calculated averaged normalized spectral reflectance and the normalized measured spectral reflectances of the oxide layered silicon wafers averaged over the bandwidth of each LED determined by the ratios $S_{mj}/S_{Sij}$. These ratios are the ratios of (a) the measured value for each LED of the impinging light power $S_{mj}$, for reflected light impinging on a detector with each of the oxide layered silicon wafers specimens reflectance characteristics alternatively influencing the result, to (b) the corresponding measured value for each LED of the incident light power $S_{Sij}$, for reflected light impinging on a detector with just the blank silicon wafer specimen reflectance characteristics influencing the result, as $$f(\vec{x}) = \sum_{j=1}^{N} \sum_{m=1}^{M} \left[ \frac{S_{mj}}{S_{Sij}} - \frac{\int_{\lambda_{cj}-\Delta\lambda_j}^{\lambda_{cj}+\Delta\lambda_j} R_m(\lambda) d\lambda}{\int_{\lambda_{cj}-\Delta\lambda_j}^{\lambda_{cj}+\Delta\lambda_j} R_{Si}(\lambda) d\lambda} \right]^2.$$

In the above equation, the vector $\vec{x}$ frepresents the fitting variables, or in vector component form, $$x_1=t_1, \ldots, x_M=t_M, x_{M+1}=\Delta\lambda_1, \ldots, x_{M+N}=\Delta\lambda_N.$$

Here again, forming the ratios $S_{mj}/S_{Sij}$, i.e. normalizing the measured data, eliminates the consequences of pixel to pixel variations in CCD array 20, and of illuminating light beam spatial variation, to the precision of the measurement.

In this target function there are all together M+N fitting variables. On the other hand, there are M×N independent measurement data points obtained in a specimen measurement system corresponding to measuring the reflectance characteristics of M standard reference specimens with film layers therein that are measured using N LEDs in source 11. Since M×N>M+N, the above least-squares fitting technique can proceed to find the fitting variables through minimizing the above target function $f(\vec{x})$ using standard algorithms and software programs for the $k^{th}$ test site. One satisfactory algorithm is the so called Levenberg-Marquardt method. Note one additional advantage of this calibration method is that one does not need to know exactly the thicknesses of films on the silicon dioxide samples. That is, the bandwidth of each of the LDs/LEDs switched on within source 11 for these measurements can be determined based on the use of a selected number of standard references in the form of substrates each supporting an additional deposited film layer beyond the single blank silicon wafer, and the thicknesses of these film layers is also determined.

Turning to the measuring of the parameters of actual specimens, rather than standard reference specimens, in specimen measurement systems 10, 10', 10" and 10'" described above, the Airy reflectance formula relied upon in the target function must be based on the reflection coefficients corresponding to the film stacks in those actual specimens rather than using the Airy reflectance formula with the reflection coefficients given above for the set of standard reference specimens with single deposited film layers supported on a substrate. Given a film stack of L layers, with refractive indices $n_j$ and thicknesses $t_j, j=1, 2, \ldots L$, and the refractive index of the substrate $n_{L+1}$, the reflection coefficients are calculated beginning at the interface between the layer L and the substrate or $r_{L,L+1}$, and then again at the interference between layer L−1 and layer L or $r_{L-1,L}$, to thereby provide the reflection coefficient for the film stack consisting of both of these interfaces through use of Airy's formula or $$r_{L-1,L+1} = \frac{r_{L-1,L} + r_{L,L+1} \exp(i4\pi n_L t_L/\lambda)}{1 + r_{L-1,L} r_{L,L+1} \exp(i4\pi n_L t_L/\lambda)}.$$

Repeating this calculation for the next layer and iterating in this manner to the first layer results in the reflection coefficient for the film stack containing all the layers 1 to L or $$r_{1,L+1} = \frac{r_{12} + r_{2,L+1} \exp(i4\pi n_1 t_1/\lambda)}{1 + r_{12} r_{2,L+1} \exp(i4\pi n_1 t_1/\lambda)}.$$

The reflectance of the film stack is then given by $$R(\lambda) = |r_{1,L+1}|^2 = \left| \frac{r_{12} + r_{2,L+1} \exp(i4\pi n_1 t_1/\lambda)}{1 + r_{12} r_{2,L+1} \exp(i4\pi n_1 t_1/\lambda)} \right|^2.$$

Then, by adjusting the L fitting variables in the "target function" and this series of equations in the film stack model just given using the "target function" given previously above with $R(\lambda)$ substituted therein for $R_m(\lambda)$ and with L substituted for M therein, and further using the calibrated bandwidths for the LEDs switched on within source 11 found from the variables fitting described above, the difference between the measured data and the calculation, that is, this "target function", can be minimized. The result therefrom is the finding of vector $\vec{x}$ represents the fitting variables, or in vector component form, $x_1=t_1, \ldots, X_L=t_L$, that is, those thicknesses of the films in the film stack at the $k^{th}$ test site. Thus, thin-film layer properties such as thickness can be measured optically using relatively cheap LEDs rather than LDs or LEDs plus narrowband filters.

Figure 12:
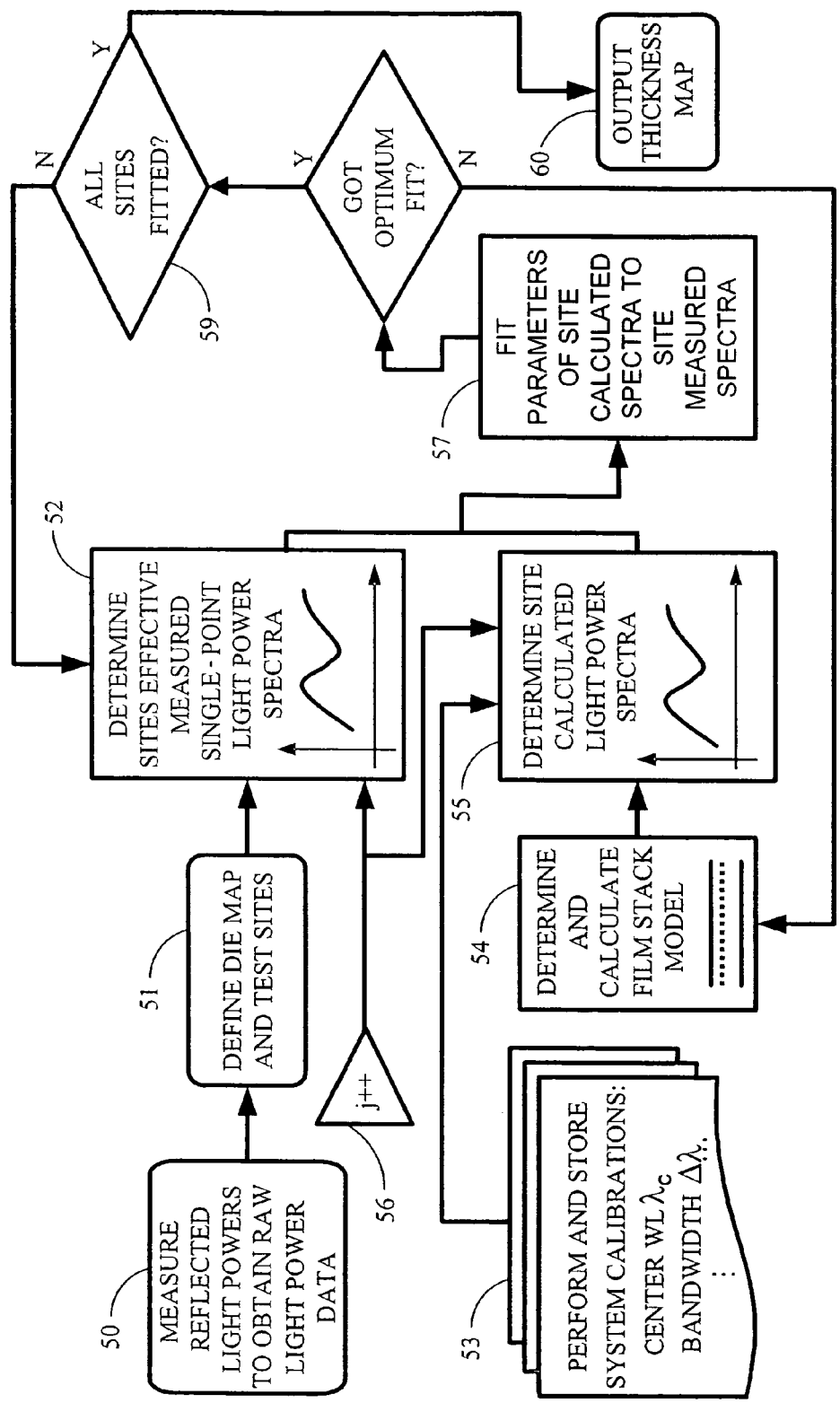
FIG. 12 shows a flow chart illustrating data processing methods used in the present invention.

In FIG. 12, a flow chart is shown that indicates the measurement process steps followed to obtain the film thicknesses at various test sites in a specimen 15 being measured. First, as indicated in a function block, 50, the measured raw data are collected for the specimen 15 being measured, that is, photovoltage signals are developed by CCD array 20 proportional to the power of the light impinging thereon derived from the light provided from source 11 that is reflected from that specimen 15. These data are represented in the memory of computer 22 as a spectroscopic image $P=P(x, y, \lambda)$, also storing there both associated specimen spatial positions and source 11 illumination wavelengths. Each pixel of CCD array 20 is mapped to a defined measurement area on the exposed surface of the particular specimen 15 being measured.

Next, as indicated in a further function block, 51, a die map/site map is defined for the particular specimen 15 being measured by dividing, spatially, the acquired spectroscopic image data into selected dies and test sites, as described above. For each such test site involving more than one pixel in CCD array 20, the effective single-point light power signal is determined based on the averaged light power data acquired from each pixel in that test site for the light power provided by each LD/LED switched on in source 11 for the particular specimen 15 being measured using well known spatial averaging algorithms to thereby provide the spectral data for that site as indicated in another function block, 52. At this point, a thickness map of the film stacks over the surface of the particular specimen 15 being measured on a site by site basis is determined by the least-squares fitting of the measured spectral data for each site to the calculated spectral model. Completing a thickness map for the specimen requires repeating the fitting process site by site.

Several system parameters are calibrated, as indicated above, and then reused for the film thickness determination at all test sites such as center wavelengths of LDs/LEDs 31 through 36, and their respective bandwidths (or, for LEDs used with narrow bandpass filters in alternatives as described above, the resulting center wavelengths and bandwidths for such LED-filter systems) using standard reference specimens such as references based on silicon wafers as indicated in a function and data storage block, 53. These wafers can include blank silicon wafers and silicon wafers supporting native oxide layers of various thicknesses typically from 2 to 3 nm. Other examples of standard reference wafers are, but not limited to, silicon wafers supporting layers of various thicknesses of silicon nitride, or $Si_3N_4$, or alternatively polysilicon. Alternatively, standard references can be formed by silicon wafers supporting layers of other materials such as silicon germanium, chemically represented as SiGe, or gallium arsenide, chemically represented as GaAs, or indium phosphide, chemically represented as InP or, in a further alternative, the wafers themselves can be made of these materials rather than silicon. Standard reference specimens can also be other kinds of layers that can be supported on wafers of any of these kinds of materials are metal layers such as copper, tungsten, tantalum, or aluminum. Such calibration standard reference specimens can be alternatively positioned either at the periphery of the collimating mirror or at the periphery of the specimen to be measured, or at other places in the measurement system, to thereby intercept a portion of the illumination beam, thus enabling the calibration process while the specimen to be measured is in place for such measurement so as to allow calibration and obtaining reflected light raw data to proceed concurrently.

In addition, a previously determined film stack model for the film stack structure of the test sites in the particular specimen 15 being measured is stored in a further function and data storage block, 54. The calibration information provided in block 53 and the stack model provided in block 54 are used in yet another function block, 55, to determine the calculated site spectra for the test sites in the particular specimen 15 being measured. A light emitter counter, 56, for j light emitters in source 11 directs that single-point light power spectral data for a site provided by block 52 and the calculated light power spectra provided by block 55 are provided for each light emitter switched on in source 11. The effective measured single-point light power spectral data for a site provided by block 52 and the calculated light power spectra provided by block 55 for the j light emitters are brought together in a joint input function block, 57, and the difference therebetween is used in minimizing the same in the least-squares parameter fitting calculation.

Whether this difference has been minimized is decided in a decision diamond, 58. If not, new calculated light power spectra are determined by systematically changing the fitted parameters such as film thicknesses until such a minimum has been achieved. Once achieved, a decision diamond, 59, determines whether all sites in the specimen being measured have had the associated parameters determined therefor and, if so, an output thickness map is provided in a final function block, 60. If not, the single-point light power spectral data for another site is provided by block 52 and a further parameter fitting process is undertaken by the specimen measurement system.

Although the present invention has been described with reference to preferred embodiments, workers skilled in the art will recognize that changes may be made in form and detail without departing from the spirit and scope of the invention.

The invention claimed is:

1. A materials properties measuring system for using electromagnetic radiation interactions with selected materials positioned at a measuring location to determine selected properties thereof, said system comprising:

an electromagnetic radiation source for providing propagating selected electromagnetic radiation beams at an output thereof;

an initial radiation redirector for receiving, at a source incidence location thereon, said selected electromagnetic radiation beams and for spatially redirecting electromagnetic radiation incident at said source incidence location thereon into corresponding uncollimated departing electromagnetic radiation initial output beams;

a beamsplitter for receiving, at corresponding ones of a plurality of incidence surfaces thereof including a first incidence surface, incoming beams of electromagnetic radiation incident thereon, including receiving said initial output beams at said first incidence surface thereof, and for splitting said incoming beams fractionally into corresponding pluralities of departing electromagnetic radiation beamsplitter output beams each propagating therefrom in a corresponding one of a plurality of directions differing from one another;

an illuminating radiation redirector for receiving, at a splitter incidence location thereon, said beamsplitter output beams corresponding to fractions of said initial output beams incident on said beamsplitter first incidence surface and for redirecting electromagnetic radiation incident at said splitter incidence location thereon into corresponding departing electromagnetic radiation illumination output beams at least some portion of which propagate to said measuring location with said illuminating radiation redirector being free of any optical lens therein receiving any diverging electromagnetic radiation beam for transmission therethrough so as to form a collimated output beam; and an electromagnetic radiation receiver for receiving beams of electromagnetic radiation propagating thereto from said beamsplitter which are a fraction of electromagnetic radiation having propagated to a said incidence surface of said beamsplitter from said measuring location.

2. The system of claim 1 wherein at least one of said initial radiation redirector and said illuminating radiation redirector is an optical lens.

3. The system of claim 1 wherein at least one of said initial radiation redirector and said illuminating radiation redirector is a mirror with a concave reflecting surface.

4. The system of claim 1 wherein said electromagnetic radiation source comprises a plurality of light-emitting diodes with differing center emission wavelengths.

5. The system of claim 1 wherein said electromagnetic radiation source comprises a plurality of laser diodes with differing center emission wavelengths.

6. The system of claim 1 wherein said electromagnetic radiation receiver is a charge-coupled device.

7. The system of claim 2 wherein said initial radiation redirector and said illuminating radiation redirector comprise a pair of optical lenses separated from one another by said beamsplitter.

8. The system of claim 3 wherein said initial radiation redirector is an optical lens positioned between said electromagnetic radiation source and said beamsplitter to have said selected electromagnetic radiation beams propagating thereto, and with said beamsplitter positioned between said mirror and a said selected material positioned at said measuring location.

9. The system of claim 4 wherein said electromagnetic radiation source further comprises a beam combiner wherein any electromagnetic radiation emitted by any of said light-emitting diodes in said plurality thereof follows at least in part a common optical path to an output through at least some portion of said combiner determined by reflections and transmissions thereof in and at said combiner.

10. The system of claim 4 wherein said electromagnetic radiation source further comprises a plurality of optical fibers with any electromagnetic radiation emitted by any of said light-emitting diodes in said plurality thereof being coupled into an end of a corresponding one of said optical fibers in said plurality thereof with that remaining end of each being joined in an optical coupler leading to an output where at least a portion of any electromagnetic radiation emitted by each said light-emitting diode in said plurality thereof appears.

11. The system of claim 4 wherein said electromagnetic radiation source further comprises a diffraction grating with each of said light-emitting diodes in said plurality thereof being positioned so that any electromagnetic radiation emitted thereby impinges on said diffraction grating at an angle with respect to an axis normal to said diffraction grating so as to be reflected therefrom to a common output location.

12. The system of claim 4 wherein said electromagnetic radiation source further comprises a plurality of optical waveguides embedded in a dielectric material with any electromagnetic radiation emitted by any of said light-emitting diodes in said plurality thereof being coupled into an end of a corresponding one of said optical waveguides in said plurality thereof with that remaining end of each being joined in an optical cavity leading to an output where at least a portion of any electromagnetic radiation emitted by each said light-emitting diode in said plurality thereof appears.

13. The system of claim 4 wherein said electromagnetic radiation source further comprises a plurality of optical filters with any electromagnetic radiation emitted by any of said light-emitting diodes in said plurality thereof being transmitted through said optical filters to reduce or eliminate selected wavelengths therein.

14. The system of claim 4 wherein said electromagnetic radiation receiver is a charge-coupled device that measures values of electromagnetic radiation incident thereon and further comprises a computing means coupled to said charge-coupled device to receive said measured values therefrom, said computing means for determining effective spectral widths for each of said plurality of light-emitting diodes represented as having emitted electromagnetic radiation at a constant power uniformly distributed over said effective spectral width using those said measured values obtained for a said selected material being a selected calibration material positioned at said measuring location during a measuring.

15. The system of claim 4 wherein said electromagnetic radiation receiver is a charge-coupled device that measures values of electromagnetic radiation incident thereon and further comprises a computing means coupled to said charge-coupled device to receive said measured values therefrom, said computing means for using previously determined effective spectral widths for each of said plurality of light-emitting diodes represented as having emitted electromagnetic radiation at a constant power uniformly distributed over said effective spectral width using those said measured values obtained for a said selected material being a selected calibration material positioned at said measuring location during a measuring and for using those further said measured values obtained for a said selected material during a measuring to obtain selected properties thereof.

16. The system of claim 5 wherein said electromagnetic radiation source further comprises a beam combiner wherein any electromagnetic radiation emitted by any of said laser diodes in said plurality thereof follows at least in part a common optical path to an output through at least some portion of said combiner determined by reflections and transmissions thereof in and at said combiner.

17. The system of claim 5 wherein said electromagnetic radiation source further comprises a plurality of optical fibers with any electromagnetic radiation emitted by any of said laser diodes in said plurality thereof being coupled into an end of a corresponding one of said optical fibers in said plurality thereof with that remaining end of each being joined in an optical coupler leading to an output where at least a portion of any electromagnetic radiation emitted by each said laser diode in said plurality thereof appears.

18. The system of claim 5 wherein said electromagnetic radiation source further comprises a diffraction grating with each of said laser diodes in said plurality thereof being positioned so that any electromagnetic radiation emitted thereby impinges on said diffraction grating at an angle with respect to an axis normal to said diffraction grating so as to be reflected therefrom to a common output location.

19. The system of claim 5 wherein said electromagnetic radiation source further comprises a plurality of optical waveguides embedded in a dielectric material with any electromagnetic radiation emitted by any of said laser diodes in said plurality thereof being coupled into an end of a corresponding one of said optical waveguides in said plurality thereof with that remaining end of each being joined in an optical cavity leading to an output where at least a portion of any electromagnetic radiation emitted by each said laser diode in said plurality thereof appears.

20. The system of claim 6 further comprising a computing means coupled to said charge-coupled device to receive said measured values therefrom, said computing means for using those said measured values obtained for a said selected material during a measuring to obtain selected properties thereof.

21. The system of claim 7 wherein said initial radiation redirector as one of said optical lenses is positioned between said beamsplitter and said electromagnetic radiation source to have said selected electromagnetic radiation beams propagating thereto and wherein said electromagnetic radiation receiver is a charge-coupled device.

22. The system of claim 8 wherein said beamsplitter is a primary beamsplitter and further comprises a collection beamsplitter positioned between said initial radiation redirector as said optical lens and said primary beamsplitter with a detection optical lens positioned between said collection beamsplitter and said electromagnetic radiation receiver.

23. The system of claim 8 further comprising an additional mirror with a concave reflecting surface positioned on an opposite side of said selected material positioned at said measuring location from said beamsplitter with a detection optical lens positioned between said beamsplitter and said electromagnetic radiation receiver.

24. The system of claim 9 wherein said beam combiner further comprises a transparent body with a pair of parallel surfaces on opposite sides thereof upon each of which is provided a row formed by a plurality of optical filters such that a midpoint between any two adjacent said filters in said row on one said surface in said pair thereof is across said body from a said optical filter in said row on said other surface in said pair thereof with each said optical filter receiving any emitted electromagnetic radiation from a corresponding one of said plurality of light-emitting diodes to be transmitted through that said corresponding optical filter to thereby reduce or eliminate selected wavelengths therein.

25. The system of claim 9 wherein said beam combiner further comprises a plurality of combiner beamsplitters provided in a row with each of said combiner beamsplitters receiving any emitted electromagnetic radiation from a corresponding one of said plurality of light-emitting diodes to be at least partially reflected toward said output.

26. The system of claim 16 wherein said beam combiner further comprises a transparent body with a pair of parallel surfaces on opposite sides thereof upon each of which is provided a row formed by a plurality of optical filters such that a midpoint between any two adjacent said filters in said row on one said surface in said pair thereof is across said body from a said optical filter in said row on said other surface in said pair thereof with each said optical filter receiving any emitted electromagnetic radiation from a corresponding one of said plurality of laser diodes to be transmitted through that said corresponding optical filter to thereby reduce or eliminate selected wavelengths therein.

27. The system of claim 16 wherein said beam combiner further comprises a plurality of combiner beamsplitters provided in a row with each of said combiner beamsplitters receiving any emitted electromagnetic radiation from a corresponding one of said plurality of laser diodes to be at least partially reflected toward said output.

28. The system of claim 25 wherein said beam combiner further comprises a plurality of optical filters each positioned between a corresponding one of said plurality of light-emitting diodes and said plurality of combiner beamsplitters to receive any emitted electromagnetic radiation from that corresponding one of said plurality of light-emitting diodes to be transmitted therethrough to thereby reduce or eliminate selected wavelengths therein.

29. The system of claim 28 wherein at least some of said plurality of optical filters can be rotated about an axis substantially perpendicular that path followed by electromagnetic radiation transmitted therethrough.

30. The system of claim 1 wherein said beamsplitter is positioned to receive said initial output beams at said first incidence location thereon where they are diverging during propagation.

31. The system of claim 4 wherein said plurality of light-emitting diodes can be switched between emitting and not emitting electromagnetic radiation individually or concurrently in any combination of individual ones thereof.

32. The system of claim 5 wherein said plurality of laser diodes can be switched between emitting and not emitting electromagnetic radiation individually or concurrently in any combination of individual ones thereof.

33. The system of claim 20 wherein said computing means obtains said selected properties of said selected material at various locations across a surface of said selected material in a selected location pattern.

* * * * *